United States Patent
Clemm et al.

(10) Patent No.: US 7,293,080 B1
(45) Date of Patent: Nov. 6, 2007

(54) AUTOMATICALLY DISCOVERING MANAGEMENT INFORMATION ABOUT SERVICES IN A COMMUNICATION NETWORK

(75) Inventors: L. Alexander Clemm, Los Gatos, CA (US); Anil Bansal, Fremont, CA (US); Prakash Bettadapur, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 823 days.

(21) Appl. No.: 10/358,676

(22) Filed: Feb. 4, 2003

(51) Int. Cl.
*G05F 15/16* (2006.01)
*G06F 15/173* (2006.01)

(52) U.S. Cl. .................. 709/223; 224/225; 224/231; 224/232; 224/233; 224/234; 224/235; 370/254; 370/351

(58) Field of Classification Search ........ 709/223–226, 709/231–235; 370/254, 351
See application file for complete search history.

(56) References Cited

U.S. PATENT DOCUMENTS

| | | | |
|---|---|---|---|
| 6,516,345 B1 * | 2/2003 | Kracht ....................... 709/220 |
| 6,981,039 B2 * | 12/2005 | Cerami et al. ............. 709/223 |
| 7,058,012 B1 * | 6/2006 | Chen et al. ................ 370/222 |
| 7,194,538 B1 * | 3/2007 | Rabe et al. ................ 709/224 |
| 7,219,124 B2 * | 5/2007 | Cerami et al. ............. 709/203 |
| 2002/0099841 A1 * | 7/2002 | Cerami et al. ............. 709/231 |
| 2002/0111883 A1 * | 8/2002 | Cerami et al. ............. 705/28 |
| 2003/0037327 A1 * | 2/2003 | Cicciarelli et al. ......... 717/178 |
| 2003/0187992 A1 * | 10/2003 | Steenfeldt et al. ......... 709/227 |
| 2003/0233438 A1 * | 12/2003 | Hutchinson et al. ....... 709/223 |
| 2004/0042416 A1 * | 3/2004 | Ngo et al. ................. 370/254 |
| 2004/0205167 A1 * | 10/2004 | Grumann ................... 709/220 |

OTHER PUBLICATIONS

Alexander Clemm, et al., "Auto-Discovery at the Network and Service Management Layer," presented at the 8th IFIP/IEEE, International Symposium on Integrated Network Management, Mar. 24-28, 2003, 14 pages.

* cited by examiner

*Primary Examiner*—David Wiley
*Assistant Examiner*—Alina Boutah
(74) *Attorney, Agent, or Firm*—Hickman Palermo Truong & Becker LLP

(57) ABSTRACT

An automatic service discovery approach allows a network management system to discover service managed objects from the network, eliminating the need for a user or other management application to provide such information. As a result, a network management system can automatically perform network-level or services level discovery of objects and services for which network components have no understanding. Embodiments are applicable, for example, in the context of management of packet voice (VoIP, VoATM) and metro Ethernet (TLS service) domains, as well as other domains.

38 Claims, 12 Drawing Sheets

AUTOMATICALLY DISCOVERING MANAGEMENT INFORMATION ABOUT SERVICES IN A COMMUNICATION NETWORK

FIELD OF THE INVENTION

The present invention relates to managing communication networks, such as packet-switched networks that carry voice call and signaling information. The invention relates more specifically to automatically discovering management information about services in a communication network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Telecommunications service providers and equipment manufacturers are rapidly developing and deploying packet-switched data communication networks that can carry voice and telephone call and signaling information, and that conform to published, non-proprietary engineering standards and protocols. Such "open packet telephony" ("OPT") networks allow for integrating multiple services, such as voice and data, on the same network, which results in a cost savings.

The TMN (Telecommunications Managed Network) hierarchy defines five layers of management systems that may be used to manage such telecommunications networks. At each layer, there are associated management systems. Systems at the upper four layers include Business Management Systems (BMS), Service Management System (SMS), Network Management Systems (NMS), and Element Management Systems (EMS). At the network element layer, there are interfaces to the higher-level systems, usually based on established protocols (e.g., TL1, SNMP, etc.).

According to TMN standards, Network Management Systems deal with network capabilities including the managed view of the network focusing on end-to-end connectivity (and presentation of a network view to SML). Element Management Systems deal with network element data such as logs and control of managed portions of network elements, and mediation between the Network Management Layer (NML) and Network Element Layer (NEL). Network Element layer systems deal with interfaces between managing system and equipment.

The network management layer and service management layer are concerned not only with network elements (NEs), but also with higher-layer aspects that indicate how the NEs relate and what services they jointly provide. Examples are connections, such as signaling backhaul connections and MGCP control connections in packet telephony networks, or concepts such as virtual switches or virtual trunks, which comprise resources on a voice gateway and voice controller. In software management systems, entities at the NE level are represented for management purposes as network element managed objects or "NE MOs." Similarly, entities at the network management level and service management level are represented as "service MOs." In some cases in which a service concept or network concept is associated with the network, a service MO depends on two or more NE MOs of multiple NEs, which are related through the service MO.

A common function of management systems operating at the element management layer, such as EMSs and systems used for monitoring purposes, is auto-discovery. Auto-discovery refers to the ability of a management system to extract, on its own, certain information about what needs to be managed, rather than requiring users to provide that information. In network and service layer management, however, information is generally not deduced from the network. Instead, information about service instances comes from the service provider and is entered by the user.

Service provisioning systems are used to drive network configurations that are required to support the services into the network. In these systems, any service information is assumed to be known in advance, and is assumed not to need auto-discovery. In short, service-related management information is controlled by the service provider and not the network. To verify that a service is provisioned correctly, generally, a service provider checks whether the current configuration in the network corresponds to the configuration it is supposed to have in support of the service. Thus, the service provider determines whether the network configuration "as built" corresponds to the network configuration "as planned." In many cases, this procedure is adequate. However, in some situations it is desirable also to discover network and service configurations, and service MOs, from the network directly, rather than depending on service-related information from other sources.

For example, assume that a service/network management and provisioning system is deployed after initial network deployment. A service provider would like to be able to see and automatically retrieve what services had earlier already been configured on the network, without needing to go through the tedious exercise or entering service MOs for the services that were already deployed. As another example, assume that a service provider has maintained poor service records, or believes that its service records are not up to date. This scenario can occur when service records do not reflect end subscribers directly, but network configurations to support certain service capacity in a given geographical area.

As another example, assume that operations personnel within a service provider's organization have bypassed service provisioning systems and provisioned service instances "by hand," resulting in certain network-layer configuration mismatches that are hard to troubleshoot. Such scenarios apply specifically in the context of packet telephony management, where concepts such as virtual switches, signaling backhaul connections, trunk groups, or zones may be discovered, or management of metro Ethernet services, where transparent LAN services may be discovered.

In all these situations, there is a need for a way for a service provider to discover, automatically with computer assistance, what services are then actually configured in the network, or offered by the network.

There is a specific need for such a capability in packet-switched networks that carry voice. There is also a specific need for this capability in network layer management tools and service layer management tools.

Other systems and products perform some forms of network discovery but they do not address the specific needs outlined above. For example, Netsys processes configuration information from configuration files with CLI commands that are uploaded from network elements, and builds an internal data model in the form of a tree with interconnected nodes that represents the processed information. This tree can also have nodes that aggregate information across network elements, for example, across several configuration files, representing network-layer information. Subsequently, this data model can be used for provisioning or to push information back down into the network.

The iGEMS system possesses a capability to discover physical network connectivity. However, discovery is limited to physical connectivity aspects. This is believed to be done with an algorithm that encodes knowledge of how to interpret and join MIB fragments of different network elements. There is still a need, however, for an approach that is not limited to discovery of physical connectivity, but can be used to discover any type of network and service level concepts that can be derived from information in network elements.

The NEC research index available online at the domain "citeseer.nj.nec.com" includes several publications about service discovery in networks. However, that form of service discovery is different from service layer object discovery. It deals with discovering services that are offered by a particular server, which announces them to the network. Thus, its approach provides brokering of services, not service MO discovery. One example is JESA, Java Enhanced Services Architecture, utilized in advertising services in ad hoc networks. Thus, there is still a need for a method for discovering service layer information from management information, without relying on service information to be explicitly advertised by the network.

Thus, traditionally, discovery by a management system is limited only to discovery of network elements such as nodes, cards, ports, etc., and not network-level or services level discovery of which network components have no notion. These approaches fail to fulfill the need for an automatic service discovery approach that allows a management system to discover service MOs from the network, eliminating the need for a user or other management application to provide such information. Such a need exists in the context of management of packet voice (VoIP, VOATM) networks and metro Ethernet (TLS service) networks; however, management systems for other kinds of networks have similar needs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
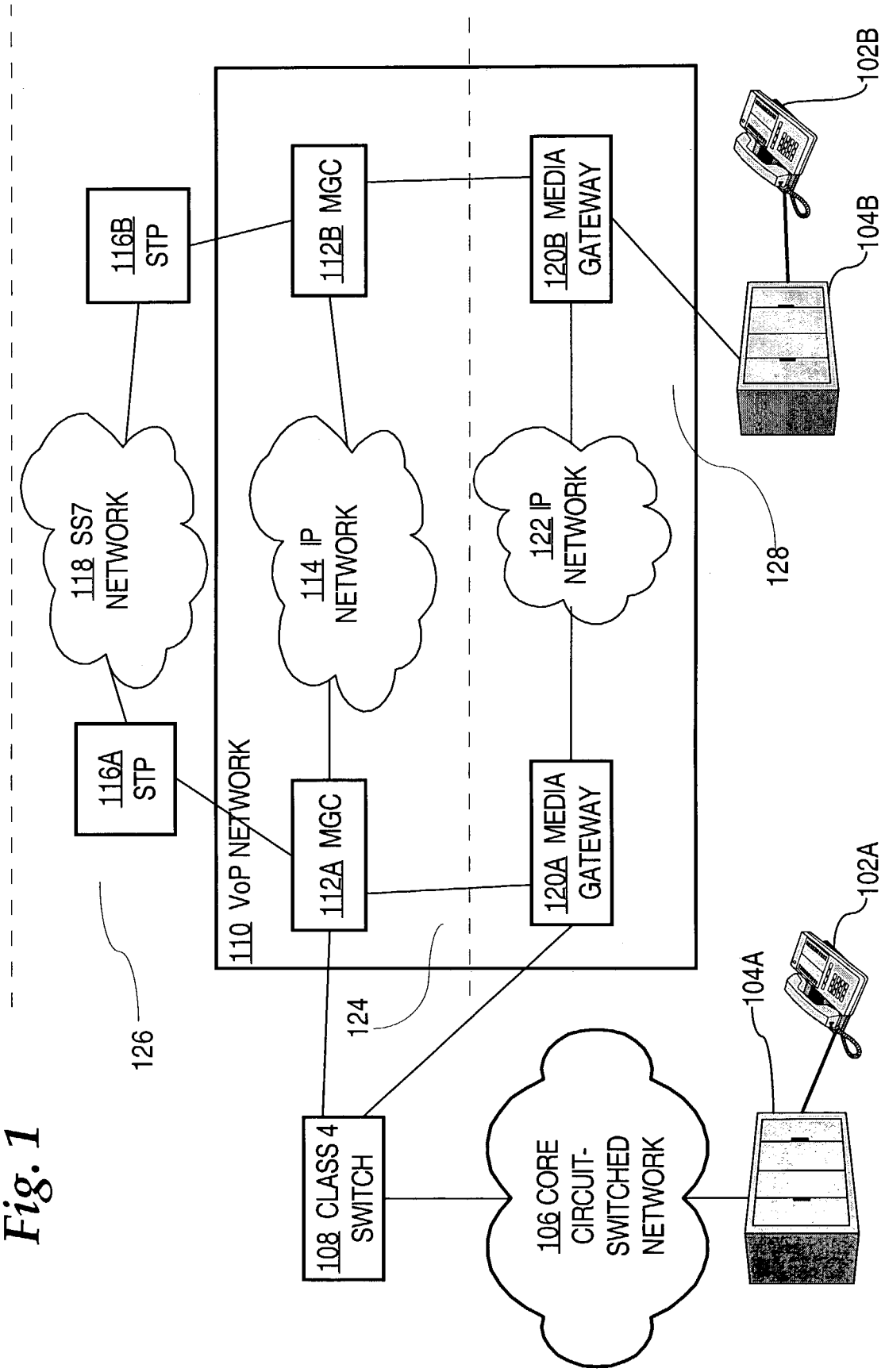
FIG. 1 is a block diagram of an example of an MGCP-based open packet telephony network.

A method for automatically discovering management information about services in a communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described using the following outline:
1.0 General Overview
2.0 Technical Overview
   2.1 Terminology
   2.2 Example Network Management Context
3.0 Method of Automatically Discovering Services in a Network
   3.1 Process Overview
   3.2 Detailed Process Description
   3.3 Example Use in the Context of Metro Ethernet
4.0 Implementation Mechanisms-Hardware Overview
5.0 Extensions and Alternatives 1.0 General Overview The foregoing needs, and other needs and objects that will become apparent for the following description, are achieved in the present invention, which comprises, in one aspect, a method for automatically discovering management information about which services are provisioned in a communication network. Network inventory information representing one or more physical network entities and one or more logical network entities is received. One or more first information elements are created to represent one or more network elements identified in the network inventory information. One or more second information elements that match the first information elements are identified and are associated with a network service. A service information element is created to represent the network service, wherein the service information element has an association to one of the first information elements and the matching second information element.

In another aspect, the invention provides a method of automatically discovering which services are provisioned in a communications network in which one or more network element managed objects that represent network elements in the communications network are discovered. One or more service discovery rules are applied to result in creating information representing network services supported by the network elements. Applying the rules involves determining whether any of the service discovery rules specifies that one of the managed object is a master network element managed object; creating a first service managed object when any of the service discovery rules specifies that a particular managed object is a master network element managed object;

and establishing a dependency relationship between the first service managed object and the master network element managed object.

According to one embodiment, an automatic service discovery approach allows management system to discover service MOs from the network, eliminating the need for a user or other management application to provide such information. As a result, a network management system can automatically perform network-level or services level discovery of objects and services for which network components have no information or understanding. Embodiments are applicable, for example, in the context of management of packet voice (VoIP, VoATM) and metro Ethernet (TLS service) domains, as well as other domains.

For example, in the packet voice context, in one aspect the invention provides a method of automatically discovering which services are provisioned in a communications network that provides packet-switched voice service, comprising creating one or more service managed objects representing a network service. One or more managed objects representing MGCP termination points in the communications network are created. A configuration of a media gateway in the communications network, which includes the MGCP termination point managed objects, is discovered. The method determines whether any of the service managed objects contain an MGCP termination point that references the media gateway, and determines whether the MGCP termination point of the media gateway references a call agent. The MGCP termination point object is associated with a MGCP connection managed object.

In general, embodiments provide an algorithmic procedure for autodiscovery of network and service layer managed objects ("service MOs"), in which the discovered information is derived from other information that is implicitly present in the network element(s) supporting it ("NE MOs"). Embodiments also provide a concept of a "master NE MO" to trigger creation of service MOs when NE MOs do not contain information that indicates a service MO.

Embodiments further provide a discovery status mechanism that indicates whether or not discovery of a service MO is complete. The status mechanism is useful because service MOs may be built incrementally from information that may be spread across several network elements and NE MOs. The status mechanism also aids in the identification of network-level configuration mismatches.

Particular embodiments are specifically applicable to autodiscover network and service layer information for packet telephony networks. Another embodiment is specifically applicable to autodiscover network and service layer information for metro Ethernet networks. Still other embodiments may be used in other networks.

While certain embodiments are described in the context of managed objects that are appropriate for use in a network management system that is implemented using an object-oriented programming environment, the use of objects is not required. Network elements, services, and other physical network entities and logical network entities may be represented in the approaches herein using any data structure or other form of information representation.

In other aspects, the invention encompasses a computer apparatus and a computer readable medium configured to carry out the foregoing steps.

2.0 Technical Overview 2.1 Terminology

In this description, the following terms have the following meanings. For purposes of illustrating a clear example, the terminology defined in this section applies to use of the approaches herein to autodiscover network and service layer information in packet telephony networks. Other terminology applies to other embodiments for metro Ethernet networks and other contexts.

Directory Gatekeeper—a Directory Gatekeeper (DGK) is a Gatekeeper that is configured to accept location request (LRQ) forwarding. With a Directory Gatekeeper, individual Gatekeepers do not need to know about other Gatekeepers. Instead, a Gatekeeper consults its routing table, which provides a default route to a Directory Gatekeeper. This Directory Gatekeeper is more knowledgeable about the topology of the network and can forward messages over to the proper egress Gatekeeper. The egress Gatekeeper can then contact the originating Gatekeeper to complete the call setup.

DGK Group—a group of Directory Gatekeepers, in which the Gatekeepers are configured solely for the purpose of redundancy through hot standby router protocol (HSRP), and/or serving as alternate DGKs.

Gatekeeper—an H.323 Gatekeeper (GK) provides E.164 address resolution and controls access for all types of H.323 endpoints. It can provide other services to the endpoints such as bandwidth shaping and gateway location. The Gatekeeper maintains a registry of H.323 endpoints in a H.323 network. The endpoints register with Gatekeeper at start-up, and they request admission from the Gatekeeper to set up a call. Similar to GW, a GK is a role that a physical device plays in the voice network. In the global long distance voice context, in one embodiment, a Cisco 3600 series router may be used as the Gatekeeper.

GK Group—a Gatekeeper Group is an address resolution authority in a Virtual Zone. The GK Group must contain a primary Gatekeeper, and may contain a HSRP GK and/or one or more alternate GKs. GK Groups are typically established to enable load balancing among multiple gatekeepers.

H.323 Gateway (or "Gateway")—an H.323 Gateway (or "Gateway") is a type of Network Access Server (NAS) that acts as an interface between a circuit-switched PSTN network and a packetized voice network. A Gateway is the point at which a circuit-switched fax or voice call is encoded (using a CODEC) and repackaged into IP packets (or vice versa).

In a global long distance voice application, the Cisco 3640, 3660, AS5300, AS5350, AS5400, AS5800, or AS5850, or other functionally equivalent devices, may function as a Media Gateway. In this context, a Gateway initiates a call set-up with a H.323 Gatekeeper through H.225 RAS. The originating Gateway terminates the VoIP call to an appropriate destination Gateway with the Gatekeepers assistance. The terminating Gateway then re-translates the packetized voice into a format acceptable to the adjacent PSTN network. Thus, Media Gateway is a role that a physical device plays in the voice network; the same device can be configured for another role (such as MGCP gateway) in another setting.

Signaling Controller—a Signaling Controller is a network element that terminates signaling and performs signaling conversion. In the global long distance voice context, in one embodiment, a Cisco Signaling Controller (SC) complex is used as a Signaling Controller. In this context, the SC provides an SS7 (ISUP or TCAP) to Q.931-over-IP signaling conversion function. The SC terminates the Message Transfer Part (MTP) Layer 3, converts the messages to Q.931 protocol and sends them to the gateway over an IP-based NFAS D Channel. The SC provides SS7 connectivity to the PSTN for the H.323 gateways. The SC does not provide any call routing functionality in the packet network. The call processing and routing functions are handled by the Gateways and Gatekeepers.

In one embodiment, the SC complex comprises a distributed combination of multiple components. In one specific embodiment, the SC complex comprises a Cisco SC2200, 5500, and SLT 2600. However, the SC complex may be viewed as one logical network element.

H.323 Gateway—SC association-refers to the control ownership relationship between SC and H.323 Gateway. This relationship is reflected through a set of control connections between an H.323 Gateway and SC. This includes xGCP connections, signaling backhaul, as well as any resource coordination connections. In the global long distance voice context, this includes one control association: Q.931 backhaul for D-channel over Redundant Link Manager over RUDP.

Region—a Region is a logical container that partitions the H.323 voice network. It may contain zero or one DGK Group, and one or more H.323 zones.

Router—a router is a network device that performs packet routing functions. Depending on the service modules installed and the software settings, the same physical router can play different roles, including acting as a layer 3 IP router, a voice gateway, a gatekeeper, a SLT, or a voice gateway with embedded SLT. In the future, a router can even be configured to act as a gateway and gatekeeper at the same time.

Signaling port—a port provided by a virtual gateway that terminates signaling; also termed D-channel port.

Trunk—a port provided by a virtual gateway that terminates a voice channel. Typically, a DS0.

Virtual Gatekeeper—a logical container for a gatekeeper and a route server. One function performed by a virtual gatekeeper in the signaling and control plane concerns route selection, for example, resolution of E.164 addresses to network addresses. A gateway communicates with a gatekeeper to perform route selection. In one approach, a gatekeeper communicates with a route server to perform route selection. Because the route server serves as an extension of the gatekeeper's own route selection function, use of a virtual gatekeeper to represent a combination of gatekeeper and route server is beneficial and shields users from having to set up and coordinate the connectivity between gatekeeper and route server.

Virtual SS7 Gateway—a Virtual SS7 Gateway is a logical container consisting of one Media Gateway, and one Signaling Controller, and their interconnections. The MGC functions as a SS7 signaling gateway to the MG. In the global long distance voice context, a Virtual SS7 Gateway consists of one Voice Gateway and signaling converter, such as the Cisco SC2200 Signaling Converter. An SS7 network is communicatively coupled to the signaling converter, and the signaling converter is communicatively coupled to the Voice Gateway. The signaling controller converts RUDP based MTP3 messages from the SS7 network to Q.931 format messages, which are then sent to the Voice Gateway. Use of a Virtual SS7 Gateway is appropriate only in embodiments that interface to an SS7 PSTN network.

Virtual Gateway—a Virtual Gateway is either a Gateway, or a Virtual SS7 Gateway.

Virtual Voice Port—a logical container for a virtual aggregation of signaling and a voice port.

Virtual Zone—a Virtual Zone is a group of Virtual Gateways and their associated GKs that are in the same GK Group, according to the same criteria as would be found for a canonical H.323 zone. A canonical H.323 zone consists of a set of GW groups with the same prefix; all GWs in the same zone route calls through the same address resolution authority (essentially a GK Group or OSP Server). Thus, each zone contains a list of address resolution authorities that could be used as destinations for egress routes. The address resolution authority could be a GK Group, or OSP Server. In addition, a Virtual Zone also includes the GK Group and the adjoining SS7 signaling controllers. There can be only one GK group in a zone.

Voice Port—Voice ports are found at the intersection of packet-based networks and traditional telephony networks. A voice port is essentially a collection of Ds0 that physically connect an access server to a line from a circuit-switch telephony device in a PBX or PSTN. The voice port must be configured to convey signaling information in a way that the circuit-switched network can understand. Voice ports are essentially TDM ports.

2.2 Example Network Management Context Structure

FIG. 1 is a block diagram of an example of an open packet telephony network that is based on MGCP/H.248. FIG. 1 is provided as an example, and not by way of limitation, of a context in which embodiments can be implemented. Other embodiments can be implemented in a Metro Ethernet network context, for example.

First and second telephones 102A, 102B are communicatively coupled to respective private branch exchange (PBX) devices 104A, 104B. A first PBX 104A is communicatively coupled to a core circuit-switched network 106, which internally comprises one or more conventional TDM telephony switches in, for example, the public switched telephone network (PSTN) of an incumbent local exchange carrier (ILEC). At an edge point of the PSTN, such as at a telephone company office (CO), resides a class 4 switch 108 that is communicatively coupled to the network 106 and to a first media gateway controller 112A in a voice over packet network 110. The MGC 112A is communicatively coupled to an Internet Protocol (IP) network 114 that is coupled to a second MGC 112B at another point. Collectively MGC 112A, 112B and IP network 114 form a signaling and control plane 124 of the VoP network 110.

A signaling and control plane 126 that lies logically outside the VoP network comprises first and second signaling transfer points (STPs) 116A, 116B, which are communicatively coupled to an SS7 switching network 118. These elements cooperate to provide signaling and control functions in the VoP network 110. For example, MGC 112A can backhaul certain signaling and control signals that cannot traverse IP network 114 through STP 116A, SS7 network 118, and STP 116B to reach MGC 112B.

A bearer plane 128 of VoP network 110 comprises first and second media gateways (MGs) 120A, 120B that are communicatively coupled to a second IP network 122. Alternatively, network 122 may be an ATM network that comprises one or more ATM switches. Networks 114, 122 may overlap or constitute the same network. A first MG 120A is communicatively coupled to class 4 switch 108 and to a corresponding first MGC 112A that controls it. The second MG 120B is coupled to a corresponding MGC 112B that controls it. The second MGC 120B is further coupled to the second PBX 104B.

In one embodiment, each MG may comprise one or more Cisco MGX 8260 devices from Cisco Systems, Inc., San Jose, Calif., which may be coupled by DS3 connections to the PSTN of the ILEC. One such device, or a redundant pair, is typically used. Each MG may also have a DS3 connection to a PSTN of a competitive local exchange carrier (CLEC) and a DS3 or primary rate interface (PRI) connection to a service provider network. Each MGC may comprise the combination of redundant Sun Microsystems Netra servers, Cisco VSC3000 Virtual Switch Controller software, two or more Cisco Catalyst 5500 switches that control call routing through the networks and that are interconnected through the MG, and two or more Cisco 2600 routers that function as Signaling Link Terminators (SLTs) for termination of SS7 links from the ILEC network. In this arrangement, a LAN is implemented between the MGC components consisting of a fast Ethernet cross-connection between the Catalyst 5500 switches and an SS7 backhaul connection over IP between the switches and the routers. The Cisco VSC3300 software controls the network and also controls interaction between the SS7 network and the MG. The term "virtual switch" as used in the label "Cisco VSC3300 software" is distinct from the term "virtual switch" as used in this disclosure.

In this arrangement, a call placed from telephone 102A is switched through PBX 104A, network 106, and class 4 switch 108 to MG 120A, where voice signals from telephone 102A are packetized. The packetized voice data passes through IP network 122 to MG 120B, which converts the packetized voice data back to TDM voice data that PBX 104B can carry to telephone 102B. These functions occur under the control of MGC 112A, 112B. As a result, a party at telephone 102A can hold a voice conversation with a party at telephone 102B, and the conversation is substantially carried in packetized digital form over IP network 122.

The network arrangement of FIG. 1 is provided as an example. Many variations are possible that share a common set of technical principles, namely the separation of bearer processing from signaling and control into distinct planes, and the introduction of open interfaces among the planes.

In general, bearer plane 128 is responsible for the transport of actual voice data (packet "payload"). Bearer plane 128 can use different protocols, such as IP or ATM and various adaptation layers. Network elements within the bearer plane are not concerned with the specifics of telephony applications. The bearer plane 128 may comprise a conventional IP or ATM network with IP routers or ATM switches, respectively. Media gateways 120A, 120B reside at the edge of the bearer plane; for example, the MGs 120A, 120B can be located at the carrier's central office, or they can be customer premises equipment (CPE). Bearer traffic enters the VoP network 110 through MGs 120A, 120B. Further, in networks that interconnect packet and TDM networks, MGs normally provide for conversion of TDM voice data to packet data and the converse. Switches or routers in network 122 provide a bearer fabric or "data cloud" that moves data packets among endpoints.

The Multiservice Switching Forum (MSF), an industry consortium, further divides bearer plane 128 into an adaptation plane and a switching plane. The switching plane deals with data transport, while the adaptation plane deals with the conversion of voice and adaptation of control functions to the specific bearer medium used. Functions of both the switching plane and adaptation plane can be implemented in the same physical device, under MSF guidelines.

Control plane 124 is responsible for signaling processing and call control and contains call processing intelligence in the form of MGCs 112A, 112B. The MGCs 112A, 112B control corresponding MGs 120A, 120B by instructing them when to set up or tear down connections, requesting notification of specific events for further processing, etc. MGCs 112A, 112B contain all programmatic logic required for telephony applications, including SS7 signaling termination, directory functions, and the collection of accounting information. The MSF further defines an application plane on top of the control plane, an understanding of which is not pertinent to the present disclosure.

Collectively, the bearer plane and control plane provide functionality that is analogous to that of conventional PSTN switches. Therefore, a set of one or more MGs and one or more associated MGCs are referred to herein as a "virtual switch." The term "virtual switch" as used herein differs from a similar term, "soft switch," which is sometimes used in the industry to refer to a MGC but does not include an associated MG.

Communication between the bearer plane 128 and control plane 124 in general, and between an MG 120A, 120B and a corresponding MGC 112A, 112B in particular, involves call control functions, signaling backhaul functions, and resource coordination functions. Call control functions involve proper allocation of network resources to calls, such as setting up and tearing down connections, or connection up-speeding for fax calls. Call control also involves creating records of the use of network resources that may be used as a basis for creating call data records that are used in billing services of the network provider.

Signaling backhaul relates to termination of signals. In general, signaling terminates at an MGC and not at an MG. In arrangements where signaling is physically connected through a line of the MG, e.g., channel associated signaling or primary rate interfaces, lower signaling layers such as Layer 2 are terminated at the MG. However, Layer 3 signals are backhauled to the MGC.

Resource coordination involves communicating information about the bearer plane components to the control plane, and information about the control plane components to the bearer plane. For example, the MGC is informed of certain properties of the MG, such as the available endpoints or their state. Resource coordination allows MGC and MG to directly exchange this information without requiring external provisioning.

Interfaces for the foregoing functions can be provided through one or several control protocols. For example, MGCP provides for call control and also can be used to an extent for signaling backhaul and aspects of resource coordination. Stream control transmission protocol (SCTP) may be used for signaling backhaul.

Figure 2:
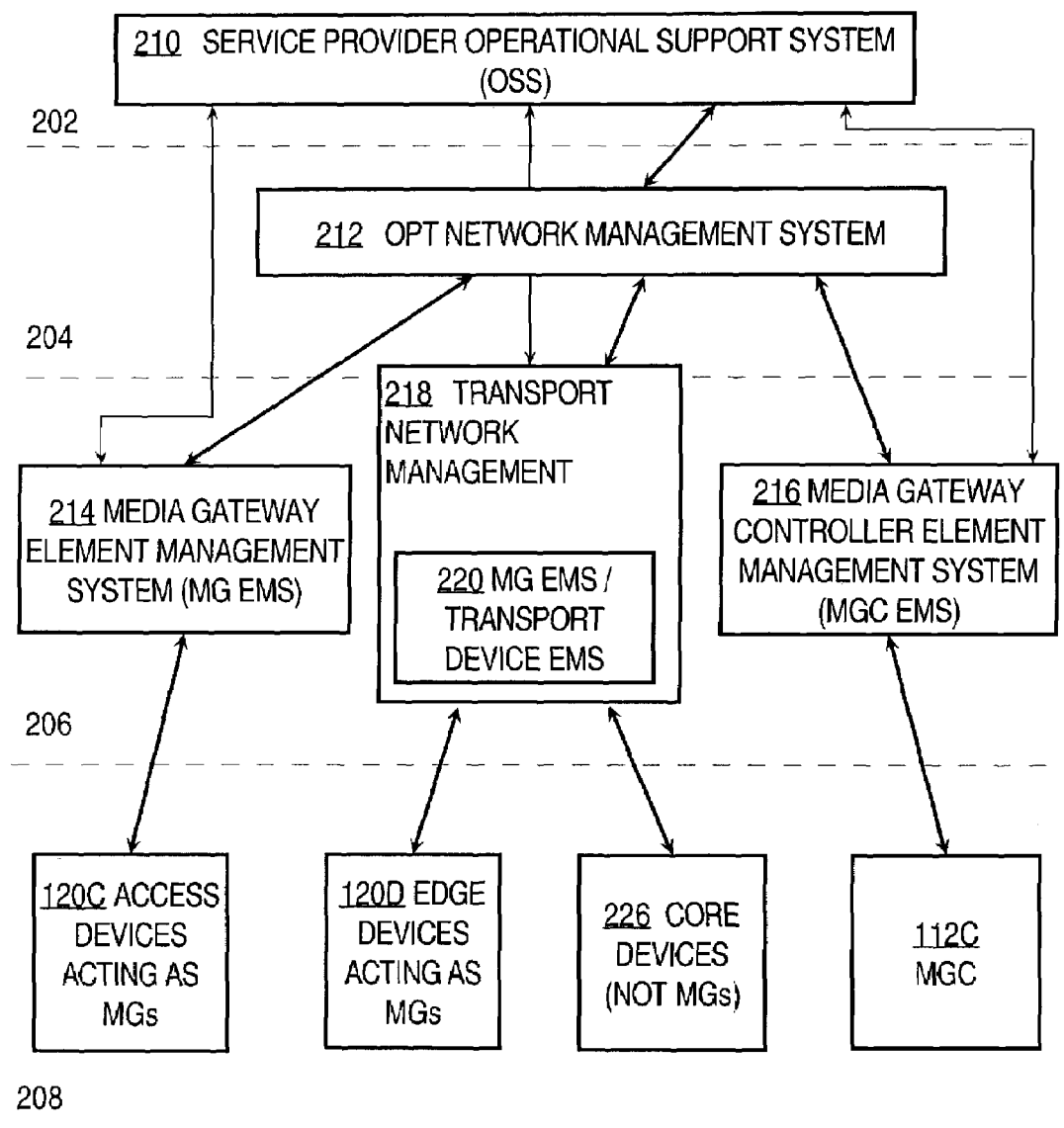
FIG. 2 is a block diagram of an OPT network management system and its relationship to other logical elements of a network management system.

FIG. 2 is a block diagram of an OPT network management system and its relationship to other logical elements of a network management system. The arrangement of FIG. 2 generally comprises a service management layer 202, network management layer 204, element management layer 206, and network element layer 208.

Network element layer 208 represents the logical position of network devices in a network. Network element layer 208 may comprise, for example, one or more access devices acting as media gateways 120C; one or more edge devices acting as media gateways 120D; one or more core devices 226, which do not act as MGs; and one or more media controllers 112C.

Element management layer 206 comprises components that manage elements in network element layer 208. Typically, the components of element management layer 206 comprise software application programs that are executed on workstations that are communicatively coupled to the elements of layer 208 or to a network in which they participate. In one example arrangement, layer 206 comprises a media gateway element management system 214 that manages MGs; a transport network management system 218 that manages edge devices 120D and core devices 226; and a media gateway controller element management system 216 that manages MGC 112C.

Service management layer 202 comprises an operational support system (OSS) that provides supervisory level control of the MG EMS 214, transport network management system 218, and the MGC EMS 216. Known OSS solutions from, for example, Telcordia or other vendors provide service order entry, service definition, and service provisioning functions.

An OPT network management system 212 is placed in network management layer 204. OPT network management system 212 is configured in a highly scalable manner because it provides a single, overall management entry point into the OPT network. For example, flow-through interfaces are provided to enable programmatic functions of components of layer 206 to access the OSS 210. Further, an interface to an element management system is not required. For example, in environments in which no element management system is available, it is still possible for OPT network management system 212 to reach devices and have them under the scope of the OPT network management system by interfacing to a configuration delivery and retrieval engine, or by interfacing directly to the devices.

OPT network management system 212 may operate in coordination with element management systems 214, 216, 218. For example, the element management systems may be used for management tasks that are unrelated to voice or otherwise element-specific. The element management systems may carry out backup and restore of individual configuration data, downloading of software images, etc. However, an element management system is not required. For example, in environments in which no element management system is available, it is still possible for OPT network management system 212 to reach devices and have them under the scope of the OPT network management system by interfacing to a configuration delivery and retrieval engine, or by interfacing directly to the devices.

OPT network management system 212 may provide a graphical user interface to facilitate user interaction. To increase user productivity, basic parameters that must be supplied are treated separately from the rest of the parameters whose configuration by the user is optional and for which the system will provide defaults. Wizard-driven screens can be invoked for the configuration of special parameters.

Many of the provisioning operations of the OPT network management system 212 lead to multiple management requests issued to one or more of the element management systems shown in FIG. 2. Within OPT network management system 212, such requests may be represented as network management transactions or provisioning jobs. The OPT network management system 212 may comprise a provisioning job manager to provide a reliable way of managing such transactions. An operator may monitor job progress using a Job Listing tab that displays details of a particular job. This allows operators to know the actual status of provisioning at any point in time and to infer, in cases of failures, what went wrong. Further, one function of OPT network management system 212 may enable an administrator or other user to initiate a process of discovering services that are configured in the network, and receive a display of information identifying or describing the services.

3.0 Method of Automatically Discovering Services in a Network 3.1 Process Overview A process for automatically discovering management information about services in a communications network is provided. In this context, "discovering services" refers to discovering service objects comprising representations in a management application of service instances. Service objects represent aspects of a service that are managed by a management application. Service objects map to other managed objects that represent how the service is mapped onto objects that represent network elements. Thus, service objects aggregate and abstract information from other managed objects, which typically are distributed over several network elements and are related in some way related to them collectively providing the service aspect that is modeled by the service object.

According to one embodiment, a two-phase approach is used for automatically discovering services in a communications network. In a first analysis phase, network and service models are identified, and master NE MOs are identified. In a second phase, the master NE MOs are leveraged to identify the corresponding service MOs.

Figure 3A:
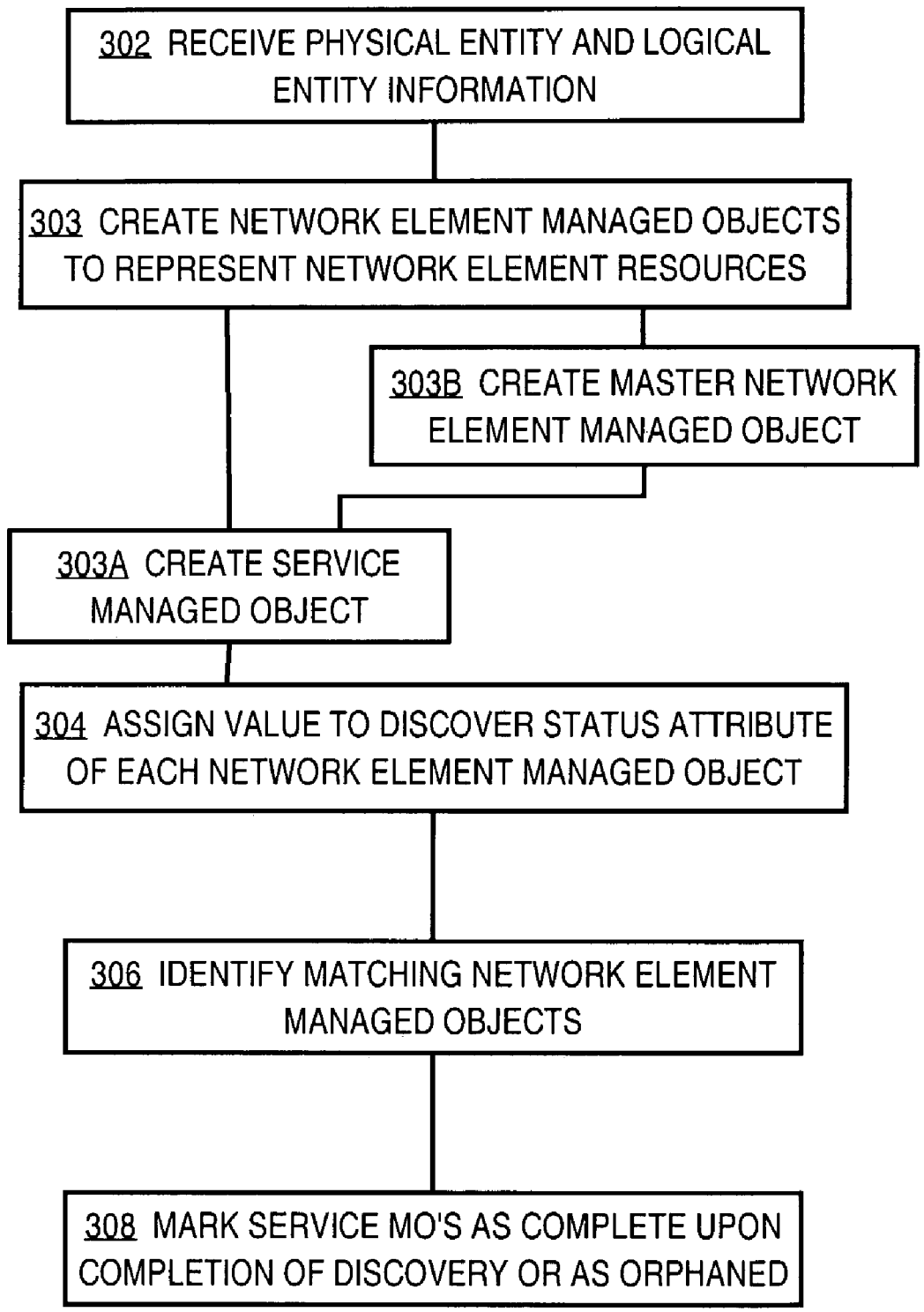
FIG. 3A is a flow diagram illustrating a high-level view of a process for automatically discovering services in a communications network.

FIG. 3A is a flow diagram illustrating a high-level view of a process for automatically discovering services in a communications network. In block 302, physical entity information and logical entity information is received from the network. For example, information is uploaded from the network or element management system, as part of initial upload or later synchronization. The information identifies physical entities (e.g., cards, ports) as well as logical entities (e.g., protocol entities, termination points, etc.) of the network.

In block 303, network element managed objects are created to represent the network element resources that were received or uploaded. Some of the NE MOs relate to service MOs and are termed "service-supporting NE MOs". Service MOs can be derived from service supporting NE MOs in two general ways. Block 302 and block 303 may involve discovering and populating NE MOs using conventional techniques.

In one approach, the NE MO contains information that indicates the presence of a certain service MO. For example, an NE MO that represents a port on a switch containing an attribute with a VLAN ID, identifying a VLAN (which is thereby equivalent to a service MO) supported by that NE MO. In the example, if an NE MO with a VLAN ID is found, a corresponding VLAN service MO is created.

In another approach, the NE MO contains information that relates it to other NE MOs (that jointly support a service MO, but without containing a "reference" to the network/service layer information directly). For example, a termination point on a device (an "NE MO") will indicate a connection (a "service MO"). A matching NE MO probably will exist on another device, e.g. a matching termination point in the case of the connection. If a matching NE MO is found, a service MO with those NE MOs is created.

When a service MO is first created, the service MO is created either on the basis of the first NE MO that contains a reference to the service that the service MO represents, or on the basis of a master NE MO, as described in the two approaches below. Since other NE MOs typically support the same service MO, the information contained in the service MO after its initial creation by the autodiscovery process is incomplete, and needs to be completed as the other service-supporting NE MOs are identified. Therefore, in one embodiment, each service MO has a "discovery status" attribute that indicates the status of discovery of the service MO. At block 304, a value is assigned to the discovery status attribute. The discovery status attribute indicates whether discovery of a service MO is "incomplete," "complete," or "complete but inconsistent."

The discovery status attribute also helps indicate cases of mis-configured services. For example, referential integrity may be violated such that the management system cannot locate other NE MOs needed for the service to be consistent and complete. The status of the service MO can serve as an indication for such situations. The discovery state attribute also allows clients to access service information even when the discovery process is not complete. For example, a client may incrementally construct a service topology as more network elements are discovered. Because complete discovery of a large network often can take a significant time, such as several hours, the discovery status attribute provides an important benefit.

Therefore, block 303 may proceed in two ways. In a first approach, as in block 303A, the process creates a service MO when a reference identifying a corresponding service or network layer entity is found. If the service MO requires further information from other NE MOs referencing the same service MO, then the service MO is marked as "incomplete."

In a second approach, as in block 303B, the process discovers certain service-supporting NE MOs, which are termed "master NE MOs," and then creates a service MO as shown in block 303A. The service MO is initially assigned a status of Incomplete, and its status changes to Complete as a result of matching another NE MO to the master NE MO, as shown in block 306. When the process is used in a packet voice network, the call controller is generally considered key to the configuration. Accordingly, the service-supporting NE MOs of the voice controller are considered the "master" NE MOs. For each master NE MO, a service MO is created.

In general, master NE MOs are defined such that there is only one master NE MO per service MO. This prevents the inadvertent introduction of too many service MOs, because redundant service MOs would be difficult to match and eliminate later. The service MO is marked as "incomplete," as not all NE MOs in the network/service level have been identified. However, the service MO has enough information to locate the "missing" NE MOs. For instance, a trunk group control indicates the port number, slot number and shelf name of the DS1 line it is controlling; as another example, a termination point has the address of a counterpart termination point. Other conventions to identify master NE MOs may be used. For example, in the case of peer-to-peer relationships, the NE MO residing on the device with the lower IP address and pointing to a higher IP address can be designated as the master NE MOs.

In block 306, one or more matching NE MOs are identified with respect to existing NE MOs. Block 306 can be performed as the process discovers NE MOs in block 302, or in an extra pass. As discovery of service MOs is completed, the service MOs are marked as complete, as shown in block 308. Service MOs that are not completed indicate mis-configurations in the network, as are service-supporting NE MOs that are "orphaned."

The process can determine that discovery of a service object is complete in block 308 based on reference to a service model created in the analysis phase described herein that indicates the contents of a complete service object. The service model specifies, for each service object, what other MOs the service object maps onto and their mutual relationships. If any of the other MOs and the relationships and mappings onto them are not established in the model, the model is in a way "inconsistent" and hence not complete. However, if all are found and the model is "consistent", then the process determines that the service object is complete.

3.2 Detailed Process Description

Figure 3B:
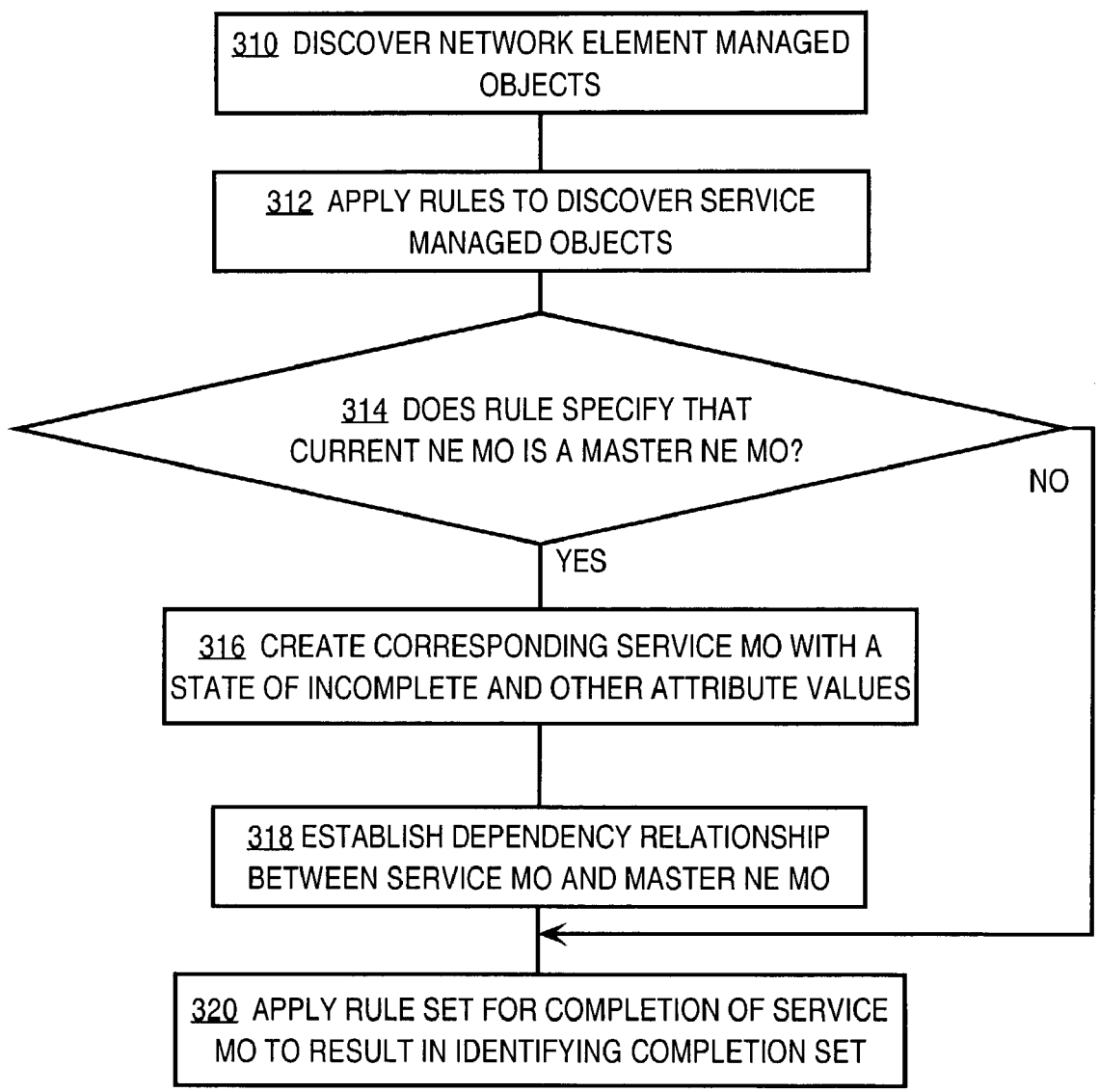
FIG. 3B is a flow diagram providing a more detailed view of a process for automatically discovering network services.
Figure 3C:
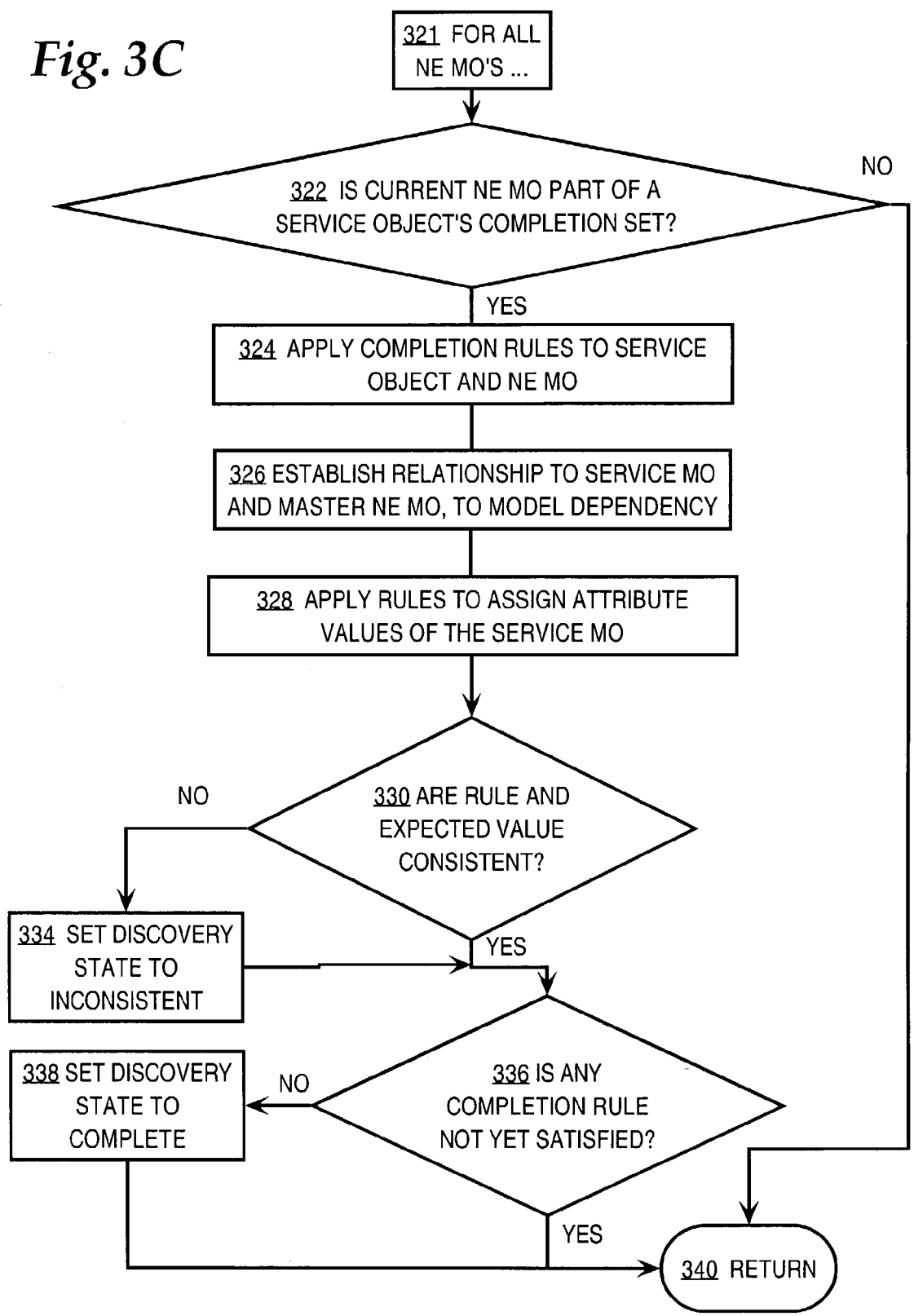
FIG. 3C is a flow diagram showing further steps in the process of FIG. 3B.

FIG. 3B is a flow diagram providing a more detailed view of a process for automatically discovering network services. FIG. 3C is a flow diagram showing further steps in the process of FIG. 3B.

Block 310 through block 320 represent an initial discovery phase. In block 310, one or more network element managed objects are discovered. Any conventional mechanism may be used, such as receiving information that is uploaded from a configuration file.

In block 312, rules developed in an analysis phase, which is described further below, are applied to discover service MOs. In particular, for each NE MO, the steps of block 314 to block 320 are performed. In block 314, the process determines if a rule for discovery of service MOs and applicable to the current NE MO identifies that NE MO as a master NE MO. For example, such a rule may specify that an NE MO is a master NE MO when it is of a certain type, belongs to a certain type of management agent such as a call agent, etc.

If the test of block 314 is true, then in block 316, a corresponding service MO is created and assigned an initial discovery state of "incomplete." Further, initial attribute values derived from the master NE MO as specified in the rules are set. In block 318, a relationship between the service MO and master NE MO is established to indicate a dependency between them.

In block 320, the rules are applied to determine what is required for completion of the current type of service MO. Specifically, one or more other needed NE MOs are identified. Examples of other NE MOs that are needed are NE MOs of a certain type of another management agent whose IP address is indicated by the master NE MO and whose value for a port matches. For example, in discovery of an MGCP connection, the rules specify that the process needs to identify an MGCP termination point at a certain media gateway. As a result, a completion set of NE MOs is created.

Referring now to FIG. 3C, blocks 322 to 340 represent a phase for completion of service MOs. The steps of blocks 322 to 340 are performed for each NE MO that is discovered, as indicated by block 321. As an alternative to the process of FIG. 3C, all candidates for an NE MO's completion may be identified, and further processing may be performed for them directly.

In block 322, the process determines whether the current NE MO is part of a completion set for a service object. If so, then in block 324, one or more completion rules are applied to the service object and NE MO. Otherwise control passes to block 340.

In block 326, the process creates and stores a relationship between the service object and NE MO. The relationship models the dependency between the service object and NE MO. In block 328, the process applies any applicable rules to fill in additional attribute values of the service MO.

In block 330, the process tests for consistency between values that are expected by the rule and the actual values that have been filled in. For example, if a consistent configuration of different NE MOs may be required to have a "working" service MO. Application of a rule may also extend the completion set. This may lead to information that other NE MOs are still needed to complete the service MO. If the test of block 330 identifies an inconsistency, then in block 334, the discovery state is set to "inconsistent."

In block 336, the process tests whether any completion rule in the rule set for completion of the current type of service MO that has not yet been satisfied. If all completion rules are satisfied, then in block 338, the discovery state of the service object is set to "complete." In block 340, the process returns control to a calling process. Thus, the process of FIG. 3C can be invoked repeatedly for multiple NE MOs that have been discovered.

Figure 3D:
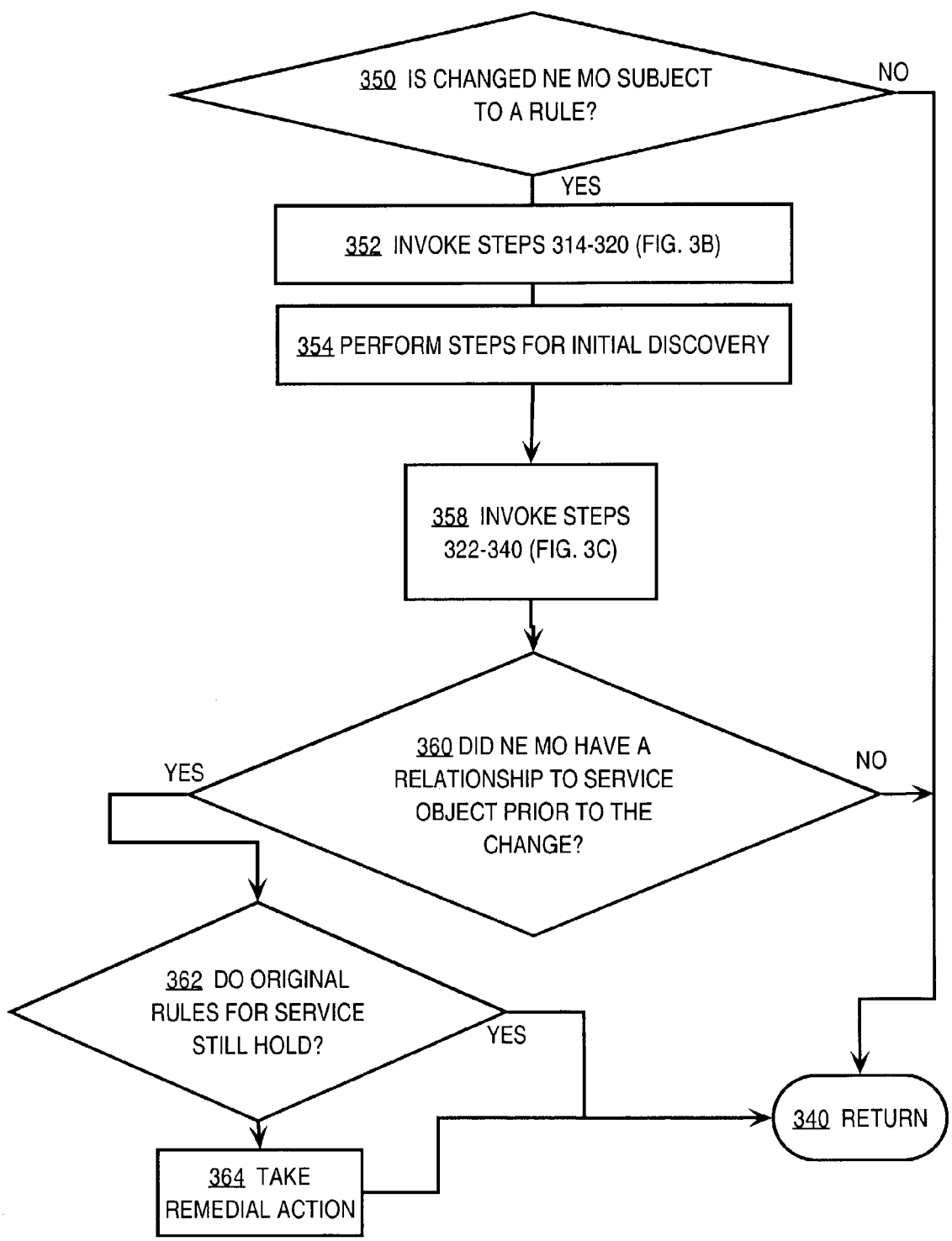
FIG. 3D is a flow diagram of monitoring steps that may be used on an ongoing basis with the processes of FIG. 3B, FIG. 3C to respond to changes in NE MOs.

FIG. 3D is a flow diagram of monitoring steps that may be used on an ongoing basis with the processes of FIG. 3B, FIG. 3C to respond to changes in NE MOs. In one approach, the steps of FIG. 3D are performed for each change in NE MOs, including creation of a new NE MO, deletion of a NE MO, or a change in attributes of an NE MO.

In block 350, a test is performed to determine if the changed NE MO is subject to a rule. If a rule for discovery of service NE MOs applies, as tested in block 352 using the process of FIG. 3B, then in block 354 the same steps are performed as for initial discovery in FIG. 3B. Thus, the service MO is created, the relationship is established, and the completion set is constructed as in block 316 to block 320 of FIG. 3B. Further, the completion rules are applied as specified in FIG. 3C.

In block 358, the steps of block 322-340 of FIG. 3C are performed; in general, a test is performed to determine whether the NE MO is part of a completion set. If so, then one or more completion rules are applied. Applying completion rules may result in completing another service MO.

In block 360, a test is performed to determine if the NE MO was related to a service object prior to the change. If so, then in block 362 a the process determines whether the rules originally applied to the service object still hold. If not, remedial action is taken in block 364. For example, if the NE MO was a master NE MO and the change is one of deletion, then the service MO is destroyed. If another rule no longer applies, then the discovery state attribute is changed to a value of "incomplete."

In block 366, control returns to a prior process.

In general, creation of a service MO occurs in response to identifying a master NE MO. However, the master NE MO may be only one of several MOs which the service MO has dependencies on, as specified by the service model. Therefore, the service MO is marked as "incomplete" since not all NE MOs relating to the service MO have been identified.

In many cases, the service MO has enough information to locate the missing NE MO. For instance, a MGCP NE MO comprises the port number and the network address of its counterpart object. Subsequent steps attempt to identify the other NE MOs that support the service MOs that have been created. If the NE MOs are already populated, and known to the management application, the service object can very quickly be completed. In other cases, the NE itself and its configuration may be not yet discovered and processed, leaving the service object incomplete in the interim. As the missing pieces of the service MOs are "completed", they are marked with a discovery status of "complete".

The steps of FIG. 3A, FIG. 3B, FIG. 3C, FIG. 3D can be interleaved. Also, the discovery process can be accelerated by first discovering all master NE MOs before other NE MOs. For example, in a packet voice network, the process of FIG. 3A, FIG. 3B, FIG. 3C, FIG. 3D may first discover all NE MOs of the call controller side before discovering NE MOs on the gateway side.

The process of FIG. 3A, FIG. 3B, FIG. 3C, and FIG. 3D may be used to perform discovery of service level entities in several different contexts or network domains. For example, in the management of Metro Ethernet networks, Transparent LAN Service (TLS) objects are service-level objects that can be discovered. TLS is used to transparently connect LANs at multiple sites as one single LAN, and could constitute a multipoint-to-multipoint connection or a single point-to-point connection. Generally, the end user is interested in only the endpoints of the TLS and does not care which intermediate nodes the circuit goes through. However, the TLS comprises multiple segments at the network layer. As part of discovery, a management application may upload information from multiple devices, and form individual segments. The individual segments are then grouped together to form a TLS service. In this domain, the first approach of discovery described above is generally used. In this domain, VLANs also can be discovered.

In the packet telephony domain, an example of a service level object that can be discovered is the virtual switch, which represents multiple physical network devices. A single master device (e.g., media gateway controller) and multiple slave devices (e.g., media gateways) are represented by a virtual switch. The virtual switch is discovered in the process of FIG. 3A, FIG. 3B, FIG. 3C, FIG. 3D by identifying the MGCP connections, derived from the MGCP termination point maintained by a media gateway controller and the MGCP termination point of the media gateway to which it points. In this domain, the second approach described above is generally used.

In the packet telephony domain, besides a virtual switch, any other virtual entity MOs that are part of the internal object model of the network management system can be discovered. For example, an MGCP connection, Backhaul connection, Virtual trunk, Virtual SS7 gateway, and Virtual zone can be discovered.

Further, in the packet telephony context, in general, master NE MOs trigger the discovery of all service layer MOs, so service MOs can be instantiated by detection of a single NE MO (the master NE MO). However, none of the service layer MOs is complete without discovering other NE MOs; they all require other NE MOs for completion, and therefore they are placed in a state of "incomplete" for some amount of time. This occurs because the service layer MOs abstract and aggregate information from gateways and gatekeepers, or call agents and media gateways, or H.323 gateways and signaling controllers, that jointly perform the service layer function. The same is true in the case where the NE MO directly contains a reference to the service MO, such as with VLANs; other NE MOs are required to complete the service MO. If a one-to-one mapping exists, then the service MO arguably is equivalent to an NE MO. With service MOs, however, the process of FIG. 3A, FIG. 3B, FIG. 3C, FIG. 3D is required to reference information that generally abstracts and aggregates information across multiple NE MOs, as the corresponding service concept is realized in a distributed fashion across several elements in the network.

Figure 4:
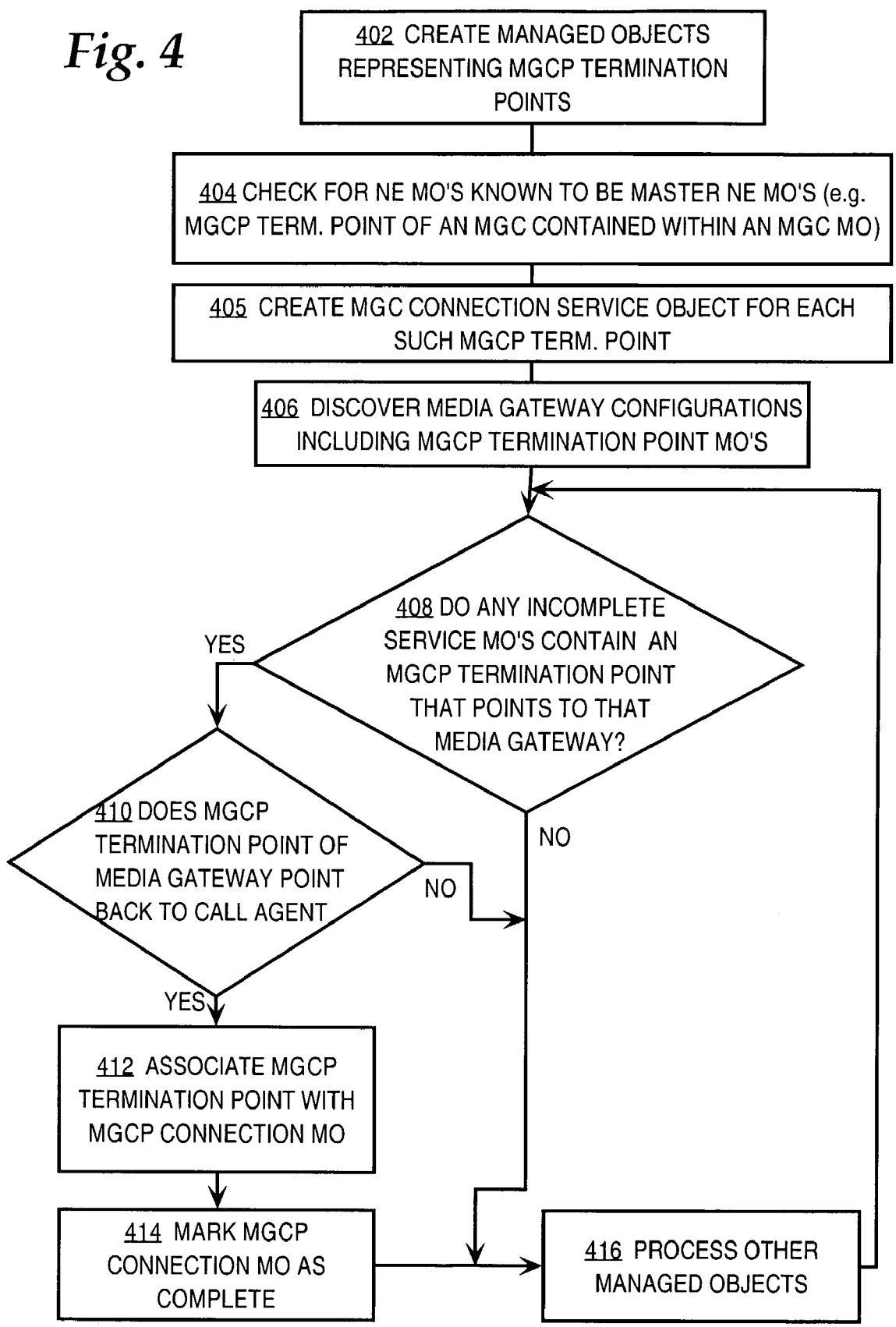
FIG. 4 is a flow diagram that illustrates an example embodiment of a process for automatically discovering services in a packet telephony network.

FIG. 4 is a flow diagram that illustrates an example embodiment of a process for automatically discovering services in a packet telephony network. The example process of FIG. 4 is directed to discovering an MGCP connection.

The process of FIG. 4 assumes that the MGCP connection service MO is based on a first NE MO representing the MGCP termination point of the call agent, and a second NE MO representing the MGCP termination point of the media gateway. By convention, the MGCP termination point of the call agent is declared to be the master NE MO.

In block 402, the process creates MOs representing its MGCP termination points. Block 402 may be performed by a management application as part of discovering a logical configuration of the call agent.

In block 404, the process checks for NE MOs that are known to be master NE MOs, including MOs that represent MGCP termination points. Thus, in the packet voice context, a master NE MO would be an MGCP termination point of a media gateway controller contained under a MO of the MGC. For each such NE MO, an MGCP connection MO (a service MO) is created and assigned a discovery status value of "incomplete," as indicated in block 405. However, the MGCP termination point contains the IP address and port number of the matching MGCP termination point at the media gateway. Block 404 may be performed by the management application as part of the service discovery process.

In block 406, media gateway configurations are discovered. As part of block 406, MGCP termination point MOs of the media gateways are discovered and populated. The completion set that is constructed using the discovery rules includes the MGCP termination point on the media gateway, contained under the media gateway managed object pointed to by the first MGCP termination point.

In block 408, the process checks whether any of the incomplete service MOs contain an MGCP termination point that points to that media gateway. The test of block 408 may involve determining if there are MGCP termination point MOs among the NE MOs that potentially support service MOs. If the test of block 408 is affirmative, then in block 410, the MGCP termination point of the media gateway is checked to determine whether it points back to the call agent. If the test of block 410 is affirmative, then in block 412 the MGCP termination point of the media gateway is associated with the MGCP connection MO, and in block 414 the MGCP connection MO is marked as complete.

Thus, in general, an automatic service discovery process proceeds as follows. Upon device discovery and population of NE MOs, the process checks for master NE MOs. For each master NE MO, a corresponding service MO is created with an initial state of "incomplete." For each service MO, the process checks whether other NE MOs can be found, for example based on foreign keys in the master NE MO. If so, then the process associates them with the service MO and updates the service MO accordingly. After the master NE MOs have been processed, the process examines other MOs that could be supporting service MOs and attempts to match them with incomplete service MOs.

Although this general process is typical, variations are possible. For example, in one variation, the media gateway is checked earlier in the process to determine whether it contains a matching MGCP termination point. However, for efficiency reasons, typically this occurs in a second pass when the logical configurations of the media gateways are discovered, as described above. Further, the process herein is not restricted to initial discovery. For example, the process may be performed whenever a change in an NE MO is detected, or whenever a new NE MO has been created. In this alternative, the service discovery process can lead to updates of service MOs.

The processes herein draw a fundamental distinction between NE MOs and service MOs. In particular, the processes herein pertain to populating the service MOs as part of discovery of service-layer information, and not to the NE MOs or discovery of the information about the network elements themselves. The NE MOs and information about the network elements may be discovered using other known techniques that are not pertinent to the present disclosure; alternatively, NE MOs can be not discovered at all, but populated by a user or another application.

In contrast with prior approaches, the present disclosure addresses discovery of service-layer information, such as service MOs, on the basis of available or existing information about the network elements.

Furthermore, embodiments allow for the service-layer information to be automatically updated as information about the network elements is updated. Thus, the process herein can incrementally discover new and changed service-layer information as new or changed information about the network elements is discovered, or as NE MOs are updated. For example, if a new NE MO is discovered, or a change in an NE MO occurs, the process herein is triggered and the service layer information is updated as applicable. As a result, any changes in service layer information are discovered.

3.2 Analysis Phase

The processes described herein may be implemented using one or more programs, routines, or other software elements in a network management application. The application may be configured with different discovery processes that embody different discovery rules for different specific services. The discovery rules embodied in the processes herein may be developed in an analysis phase, performed before carrying out the processes of FIG. 3A, FIG. 3B, FIG. 3C, FIG. 3D or FIG. 4, by analysis of object models that are used to perform other management functions and other steps. For example, development of the model of service MOs, determination of NE MOs a service MO will depend on, establishment of a convention to determine the master NE MO, and other analysis steps may be performed as part of developing the management application, and the rules used for automatic service discovery as described herein may be inferred from such analysis steps.

In one approach, during the analysis phase, prior to applying the discovery processes of FIG. 3A, FIG. 3B, FIG. 3C, FIG. 3D, FIG. 4, for each service object a definition about how to select its master NE MO is created. In general, the definition of how to select a master NE MO is performed on the basis of NE MO classes that reside in agents. For example, a definition of how to select a master NE MO may be performed on the basis of MGCP termination points that are part of devices serving as media gateway controllers.

The analysis phase also defines how the service MO is derived from the master NE MO (for example, how attributes are populated), and how to recognize other NE MOs that belong to the same service MO (for example, recognition is performed based on a combination of object type, containing network element, and attribute values). The analysis phase can be applied to any and arbitrary types of service. Thus, there is no restriction on the service MOs that can be discovered, as long as appropriate rules are defined in the analysis phase.

The analysis phase results in a set of rules that may be coded into embodiments of the processes described herein. Alternatively, the rules could be created and stored as abstract rules that are interpreted by a rules engine.

In one approach, each different type of service-layer information, and each corresponding type of service MO has a set of rules. The rules for different service MOs may differ in several aspects. For example, rules for different service MOs may vary with respect to which master NE MO applies, which other NE MOs to attribute to a given service MO (based on object type, the network element that contains the NE MO, certain attributes or configuration parameters), and how to map or aggregate service MO attributes to NE MO attributes.

3.3 Example Use in the Context of Metro Ethernet

In one embodiment, a method of service discovery may be performed in the context of a Metro Ethernet network that uses high-speed optical switching equipment and other network elements.

Figure 5A:
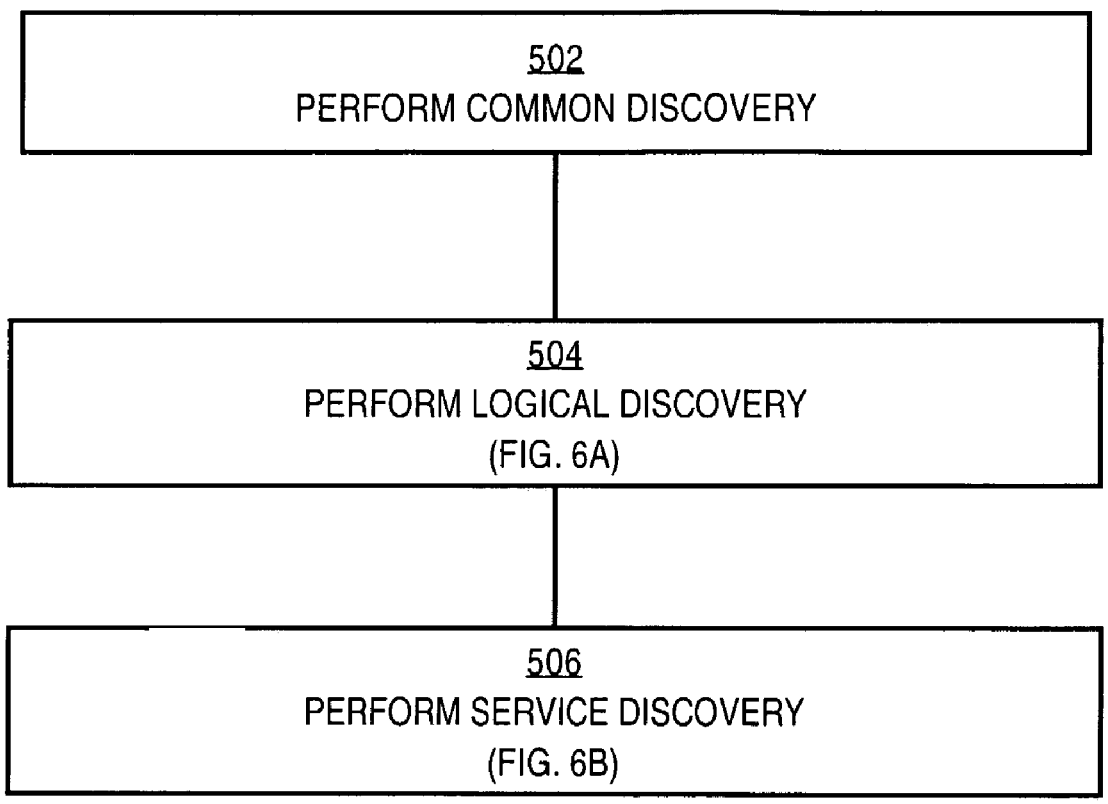
FIG. 5A is a flow diagram of a process of performing automatic service discovery in the context of a Metro Ethernet network.
Figure 5B:
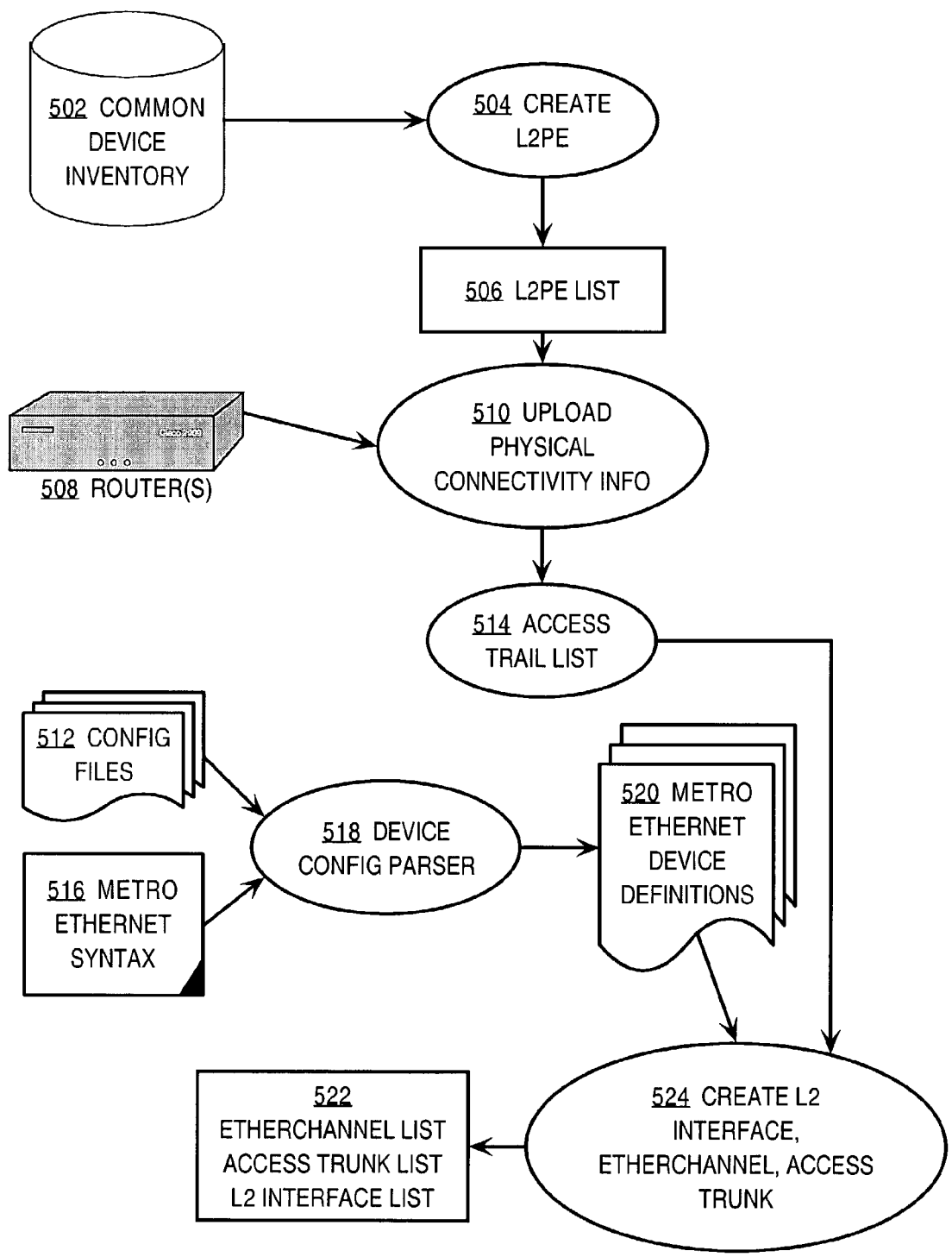
FIG. 5B is a data flow diagram illustrating data sources and transformation operations that may be used in the process of FIG. 5A.
Figure 6A:
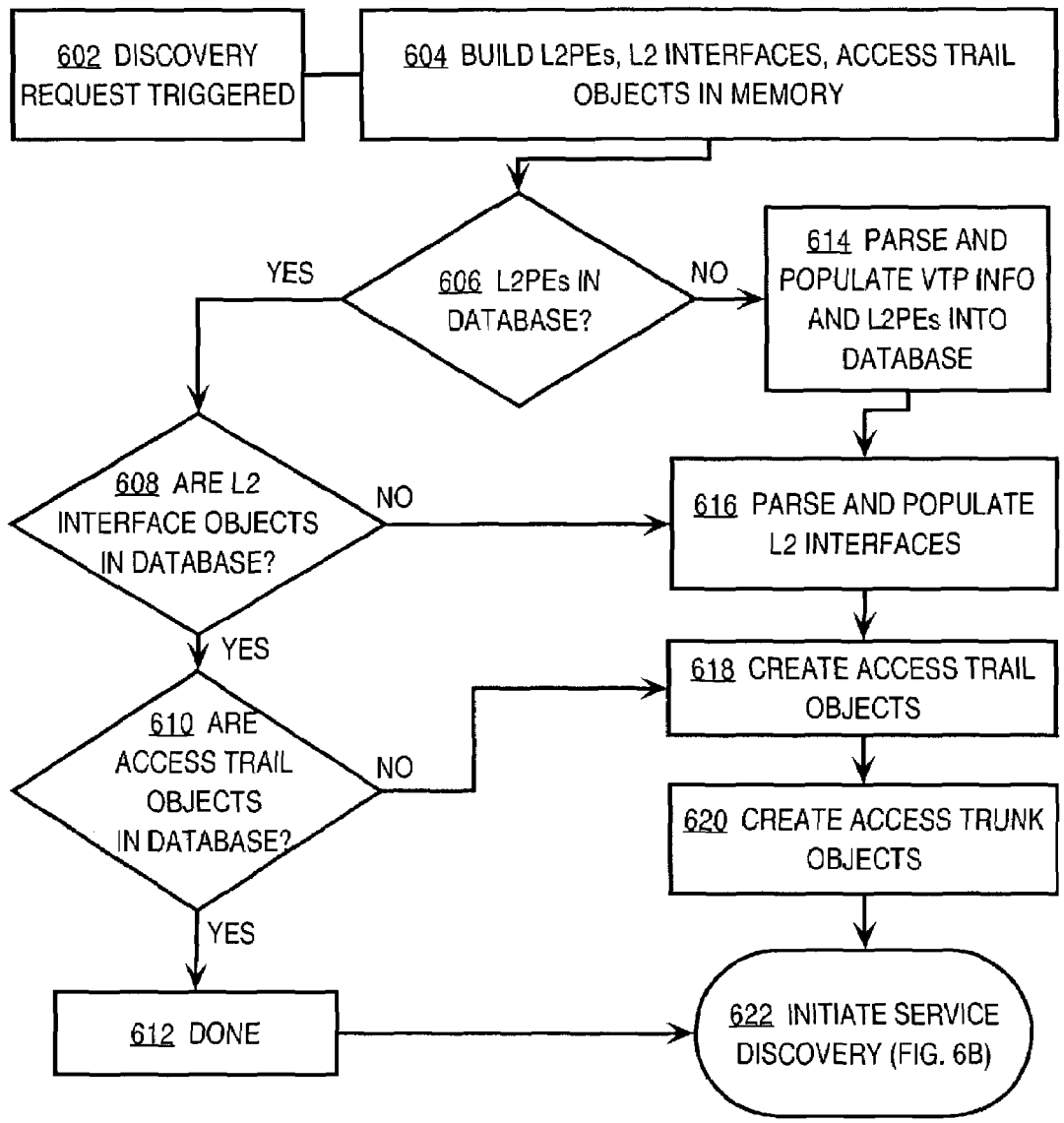
FIG. 6A is a flow diagram of a process of logical discovery.
Figure 6B:
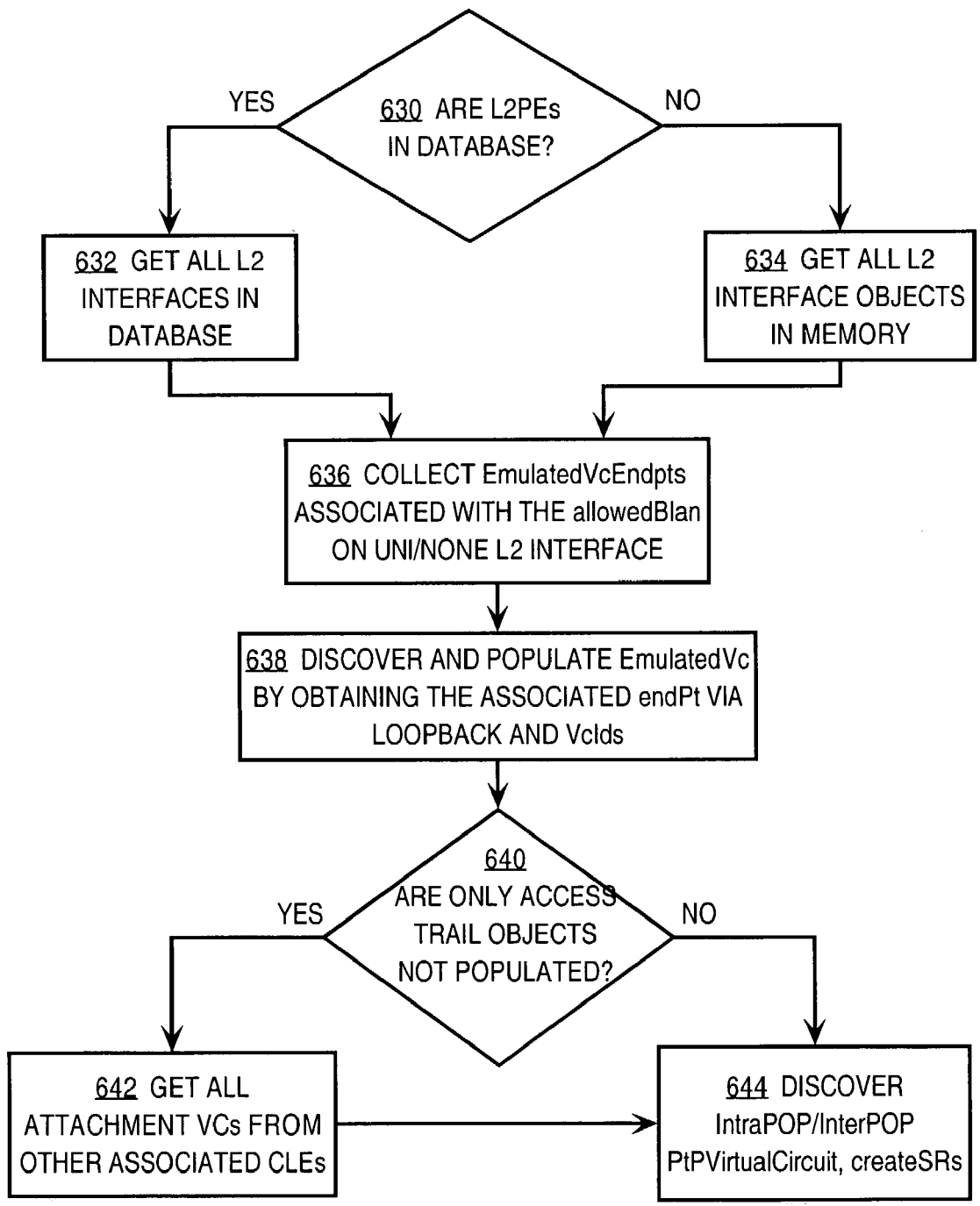
FIG. 6B is a flow diagram of a process of service discovery.

FIG. 5A is a flow diagram of a process of performing automatic service discovery in the context of a Metro Ethernet network. FIG. 5B is a data flow diagram illustrating data sources and transformation operations that may be used in the process of FIG. 5A. FIG. 6A is a flow diagram of a process of logical discovery. FIG. 6B is a flow diagram of a process of service discovery.

Referring first to FIG. 5A, in block 530, a Common Discovery phase is performed that involves discovery of information about network devices common to multiple services. Known techniques may be used to perform Common Discovery. As a result, a Common Discovery Inventory database (CDI) 502 (FIG. 5B) is created. In block 532 of FIG. 5A, a logical discovery phase is performed, as described further below with respect to FIG. 6A. In block 534, a service discovery phase is performed, as described further below with respect to FIG. 6B.

The logical discovery process discovers logical objects corresponding to Metro Ethernet service. For example, the logical discovery process discovers Metro Ethernet devices, physical connections between devices, Metro Ethernet interfaces, and trunks. These logical objects form the basis on which the service objects are created. In one embodiment, logical discovery involves the following steps, which are described in conjunction with FIG. 5B and FIG. 6A:

1. A Common Discovery process starts the Metro Ethernet ("ME") Discovery process. As indicated in FIG. 6A, block 602, a request for discovery may be issued by a user who is interacting with the graphical user interface of a management application or the request could be started automatically at the system startup time.

2. The ME Discovery process performs a "scope get" operation on the CDI database 502, and retrieves device information from the database. The device type, such as POP and CLE, is populated by the common discovery process, and is stored in the CDI database 502 in a form that indicates an association to ME, such as ME-POP and ME-CLE. As indicated in block 604 of FIG. 6A, the foregoing step may involve creating and storing objects representing Layer 2 provider edge (L2PE) devices and access trails in memory. As indicated in FIG. 5B, records from CDI database 502 are used to create L2PE objects in step 504, resulting in creating a list 506 of L2PE devices. Referring again to FIG. 6A, in block 606 a test is performed to determine if the L2PE objects are in the database. If not, then in block 614 such objects are populated into the database.

3. For all ME Devices, configuration files 512, which are identified in an attribute in records in CDI database 502) are parsed using a Device Configuration Parser. As shown in FIG. 5B, configuration files 512 may be parsed by device configuration parser 518 under control of a configuration syntax 516. Parser 518 may comprise a script and syntax 516 may comprise an XML file. As a result, one or more device description files 520 are created and stored.

4. Interface information from the device description files 520 is retrieved. As shown in FIG. 5B, block 524, objects representing L2 interfaces, EtherChannels and access trunks are created and stored in a database. As shown in FIG. 6A, in block 608 a test is performed to determine whether L2 interface objects are present in the database. If not, such objects are created and populated into the database in block 616.

5. Physical connectivity information from one or more routers 508 is uploaded, as indicated by block 510. The device connectivity info is parsed and access trails are created. In addition to device connectivity info, VTP, OS version, and related data also is uploaded. The commands 508 may be used to generate additional device information for later use in service discovery, such as whether VTP and CDP protocols are in use, operating system version, and VLAN database information. In FIG. 6A, block 610, a test is performed to determine if access trail objects are present in the database. If not, then in block 618 such objects are created in the database.

6. Device connectivity information may be discovered by executing an appropriate command, such as "show cdp ne" under Cisco IOS, and evaluating data that is returned. The result data may be populated into the database.

7. Trunk information is populated by examining the device connectivity information and also from specific configuration information under the interfaces of a ME device. As a result, a list 522 is created, consisting of EtherChannel interfaces, access trunks, and L2 interfaces. As shown in FIG. 6A, in block 620 access trunk objects are created in the database. At block 622, the service discovery phase is initiated.

The purpose of service discovery is to discover end-to-end point L2VPN circuits, in order to accomplish this, certain independent objects are discovered first, which are now described. In addition, VLAN information may be obtained from each device either by parsing the configuration file or parsing output from a "show vlan" CLI command. VLAN information may be stored within L2PE objects.

According to one embodiment, prior to performing service discovery, the following objects or their functional equivalents are discovered. These objects put together form a complete end to end service: Software Virtual Interface ("SwVirtualInterface"); Emulated VLAN Circuit Endpoint ("Emulated VcEndPt"); Emulated VLAN Circuit ("EmulatedVc"); Attachment VLAN Circuit ("AttachmentVc"); Point-to-Point Virtual Circuit ("PtPVirtualCircuit")—Point-to-Point Circuit is the service. The manner of discovering such objects, and populating attribute values of the objects, may vary. According to one embodiment, the following rules are used to map objects and attributes found in the management application to the foregoing objects.

The SwVirtualInterface object is discovered during parsing the POP's configuration files, and is populated if the configuration files contain commands such as "interface vlan <id>". The SwVirtualItfId attribute maps to the <id> value. The ItfEncap attribute maps to the value ETHERNET. The ItfId attribute maps to the <id> value. The EmVcEpFdn attribute is populated if the SwVirtualInterface object is associated with an EmulatedVcEndPt object.

The EmulatedVcEndPt object is discovered during parsing POP's configuration files. It is populated if the configuration files contain commands under SwVirtualInterface such as "mpls l2transport <destAddress> <vcId>". The EmVcEndPtId attribute maps to the <vcId> value. The SvIttFdn attribute maps to the associated SwVirtualInterface fully distinguished name. The DestAddress maps to the <destAddress> value.

The EmulatedVc object is discovered when the destAddress of EmulatedVcEndPt matches another POP's loopback address. The EmVcId attribute maps to POP1's name. The _vcId_attribute maps to the POP2's name. The EmVcType attribute maps to the EoMPLS value. The FromEmVcEndPtFdn and toEmVcEndPtFdn attributes map to associated EmVcEndpt's on the two POPs.

The process used to discovery AttachmentVcs and PtPVirtualCircuit objects are different based on different services and scenarios; however, the attributes are populated the same way. In one embodiment, the following common rules are used for finding the attachmentVc objects: One interface can only associates with one attachmentVc; and the VLANs associated with the interface must be in the VLAN database and must not be reserved VLANs. The AttachmentVcId attribute maps to the value 12Itfld:vlanId. The AccessTrunkFdn attribute is populated if the attachmentVc is on a CLE, and is not in an intra-CLE scenario; otherwise, the attribute value is null. The L2ItfFdn attribute is populated with a value identifying the L2Interface that is associated with the attachmentVc.

For the PtPVirtualCircuit object, a PtpVcId attribute is generated dynamically. A FromAttachmentVcFdn/toAttachmentVcFdn attribute is assigned an FDN of the associated attachmentVc pair. An EmulatedVcFdn attribute is populated if it is an inter-POP service. A FromAccessTrunkFdn/toAccessTrunkFdn attribute is populated if the circuit associated with CLE's and it is not an intra-CLE circuit. A L2VpnFdn attribute with the L2VPN associated with the PtPVirtualCircuit object. A SrFdn attribute is populated with the L2VPN that is associated with the PtPVirtualCircuit object.

Based on the foregoing object model, two types of services may be discovered, in one embodiment: EVCS and TLS. EVCS Service Discovery is performed for three network connection scenarios: Inter-POP-PtPVirtualCircuit; Intra-POP-PtPVirtualCircut; and Intra-CLE-PtPVirtualCircuit. The Inter-POP-PtPVirtualCircuit scenario further can be considered to include three other scenarios: Single PE (betweens POPs) to Single PE; Single PE to Distributed PE (CLE) (between CLE1 to POP2 or between CLE2 to POP1); and Distributed PE to Distributed PE (between 2 CLEs).

In the Single PE to Single PE scenario, an AttachmentVc object is created if the interface's allowed VLAN list matches one of the EmulatedVcEndPt's VLAN identifier, and that VLAN is in the VLAN database. Further, a PtPVirtualCircuit object is formed to represent a virtual circuit if a match is found between two AttachmentVcs, one on POP1 and the other on POP2.

In the Single PE to Distributed PE scenario, an AttachmentVc is created on the Distributed PE side as follows. For all L2Interfaces on CLEs that are not associated with an attachmentVc, and having an endpoint that is NONE or UNI, if there is a VLAN in its allowed VLAN list that matches a VLAN in the VLAN database, and contained within the allowed VLAN list in the AccessTrunk object, and also matches the VLAN on the EmulatedVcEndPt, then an attachlnentVc is created. For attachmentVcs on a POP, the single PE to Single PE logic is followed.

Further, a PtPVirtualCircuit object may be created as follows. If there is a match between two attachmentVcs, one on CLE1 and the other on POP2, or one on CLE2, the other on POP1, then a circuit is formed.

In the Distributed PE to Distributed PE scenario, an AttachmentVc object is created using the same process described above. A PtPVirtualCircuit object is created to represent a virtual circuit when there is a match between two attachmentVcs, one on CLE1 and the other on CLE2.

For Intra-POP-PtPVirtualCircuit discovery, three scenarios exist. From the example above, a circuit can be formed between two CLES connected to same POP, between a Distributed CLE and single POP (CLE1 to POP1), or between two interfaces on a single POP. For all such scenarios, attachmentVcs and PtPVirtualCircuits generally are discovered using the same process given above for Inter-POP. However, since Intra-POP does not cross the core network, the emulatedVcEndPt is not considered in finding the attachmentVC.

For the Intra-CLE-PtPVirtualCircuit scenario, within each CLE, if overlapped VLANs are present, such VLANs are considered as intra-CLE cases. The process that is used to find the attachmentVcs and PtPVirtualCircuit is similar to the process described above for finding objects for the inter-POP-PtPVirtualCircuit scenanro; however, no EmulatedVcEndPt is involved.

TLS Service Discovery involves only one scenario, which is Distributed-PE to Distributed-PE (CLE1 to CLE2). The attachmentVcs and PtPVirtualCircuits objects are discovered using a process that is similar to the Distributed Inter-POP case described above. However, to find attachmentVcs, instead of reviewing the allowedVlan list on the UNI, the defaultVlan value of L2Interface is reviewed.

4.0 Implementation Mechanisms—Hardware Overview

Figure 7:
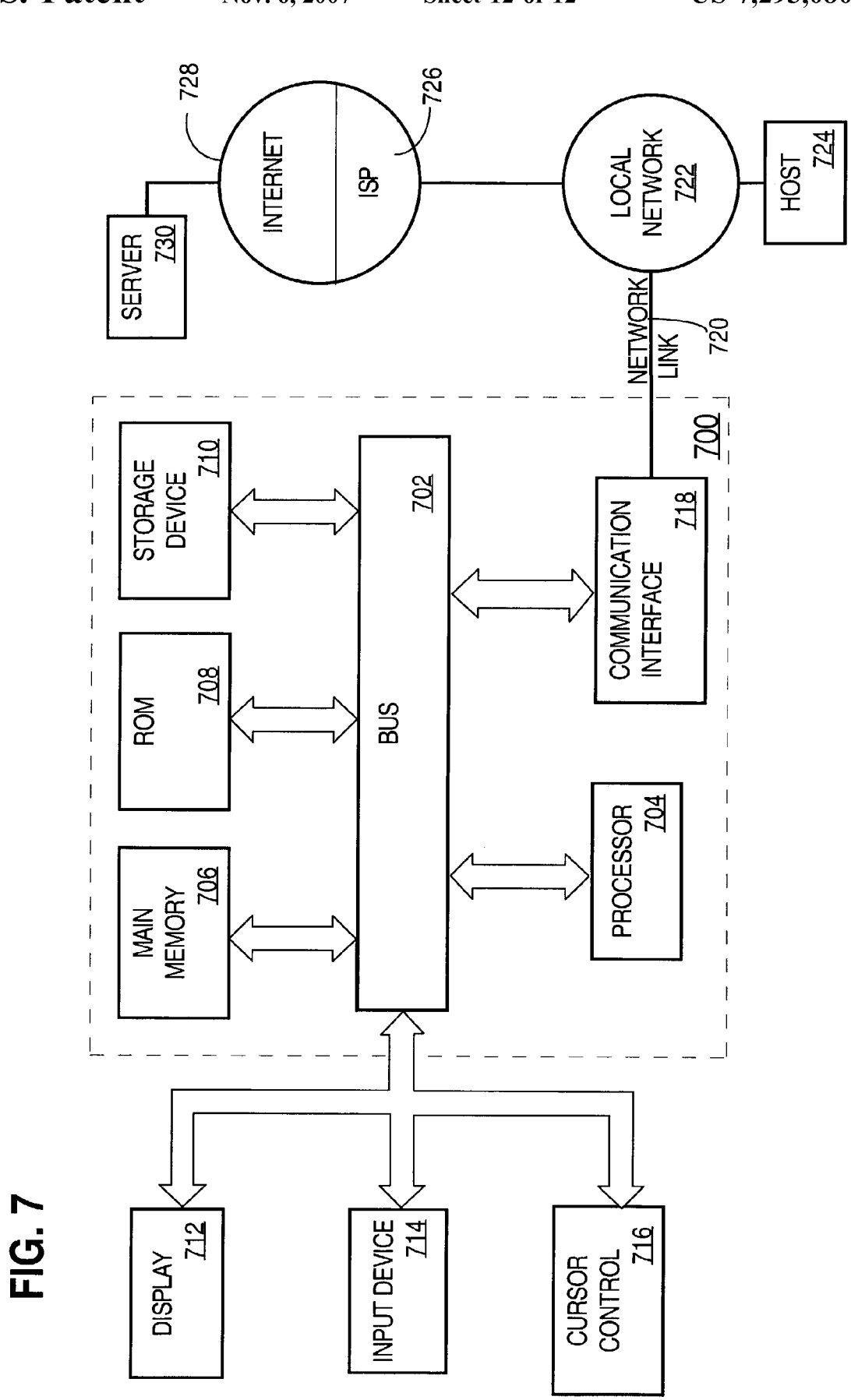
FIG. 7 is a computer system on which an embodiment of the invention may be implemented.

FIG. 7 is a block diagram that illustrates a computer system 700 upon which an embodiment of the invention may be implemented.

Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

5.0 Benefits, Extensions and Alternatives

The approaches described herein offer significant benefits. Although an embodiment is not required to have all of the following benefits, certain embodiments may offer:

1. Discovery of network and service level entities (service MOs) on networks that have already been installed and provisioned, eliminating need to reenter the same information into the management application.

2. Synchronization of network and service level entities in the management application that are inadvertently created by configuring individual network elements, working around the management application (that would otherwise be hard to get in synch).

3. Detection of inconsistent network and service level entities in the network (e.g., determining that only part of the service exists in the network), resulting in wastage of network resources.

Further, while embodiments have been described in the context of packet voice management and metro Ethernet networks, the concepts described herein are applicable analogously to other network and service management domains. Thus, in the foregoing specification, the invention has been described with reference to specific embodiments thereof. However, it will be evident that various modifications and changes may be made thereto without departing from the broader spirit and scope of the invention. The specification and drawings are, accordingly, to be regarded in an illustrative rather than a restrictive sense.

What is claimed is:

1. A method of automatically discovering management information about which services are provisioned in a communication network, the method comprising the computer-implemented steps of:

receiving network inventory information representing one or more physical network entities and one or more logical network entities;

creating one or more first information elements to represent one or more network elements identified in the network inventory information, wherein the first information elements comprise network element managed objects;

identifying one or more second information elements that match the first information elements and are associated with a network service, wherein the second information elements comprise service managed objects;

creating a service information element to represent the network service, wherein the service information element has an association to one of the first information elements and the matching second information element; and creating one or more master network element managed objects that trigger creation of corresponding service managed objects when the network element managed objects do not contain information that references one or more service managed objects.

2. A method as recited in claim 1, wherein each of the first information elements includes a discovery status attribute, and further comprising the step of setting the discovery status attribute to complete when the service information element is created and matched.

3. A method as recited in claim 1, wherein each of the first information elements includes a discovery status attribute, and further comprising the step of setting the discovery status attribute to incomplete as long as no matching service information element is identified.

4. A method as recited in claim 1, wherein the service information elements comprise service layer managed objects that are created based on information that is implicitly present in one or more network elements supporting an associated network service.

5. A method as recited in claim 1:
wherein the identifying step includes identifying one or more second information elements that match the first information elements and are associated with a network service based on information received from a plurality of network elements that are distributed across the telecommunication network; and
wherein the discovery status attribute is updated to a complete value only when the service information element is created based on information from a plurality of distributed network elements.

6. A method as recited in claim 1, further comprising the step of recognizing a network-level configuration mismatch when the identifying step fails to identify any matching second information elements.

7. A method as recited in claim 1, wherein the telecommunication network is a packet telephony network.

8. A method as recited in claim 1, wherein the telecommunication network is a metro Ethernet network.

9. A method of automatically discovering which services are provisioned in a communications network, the method comprising the computer-implemented steps of:
discovering one or more network element managed objects that represent network elements in the communications network;
applying one or more service discovery rules to result in creating information representing network services supported by the network elements, by the steps of:
determining whether any of the service discovery rules specifies that one of the managed object is a master network element managed object;
creating a first service managed object when any of the service discovery rules specifies that a particular managed object is a master network element managed object;
establishing a dependency relationship between the first service managed object and the master network element managed object;
creating and storing a completion set of other service managed objects that may match the first service managed object and indicate a service in the network;
determining whether a particular network element managed object is part of the completion set; and
applying one or more completion rules to the first service managed object and the particular network element managed object, to result in establishing a relationship among the first service managed object and the particular network element managed object.

10. A method as recited in claim 9, wherein the first service managed object has a discovery status attribute and one or more other attributes, and further comprising the steps of:
determining whether any of the other attributes of the first service managed object is inconsistent with the rules;
setting the discovery status attribute to "inconsistent" when any of the other attributes of the first service managed object is inconsistent with the rules.

11. A method as recited in claim 9, wherein the first service managed object has a discovery status attribute and one or more other attributes, and further comprising the steps of:
determining whether all completion rules are satisfied by the first service managed object;
setting the discovery status attribute to "complete" when all of the completion rules are satisfied by the first service managed object.

12. A method as recited in claim 9, further comprising the steps of:
determining that a change has occurred in a network element managed object;
determining whether the changed network element managed object is subject to one of the service discovery rules;
performing the steps of discovering, applying, determining, creating and establishing of claim 9.

13. A method as recited in claim 12, further comprising the steps of:
determining whether the changed network element managed object had a relationship to a particular service object prior to the change;
determining whether the service discovery rules associated with the particular service object remain applicable;
applying new service discovery rules when the service discovery rules associated with the particular service object are inapplicable.

14. A method as recited in claim 9, further comprising the step of recognizing a network-level configuration mismatch when the identifying step fails to identify any matching second information elements.

15. A method as recited in claim 9, wherein the telecommunication network is a packet telephony network.

16. A method as recited in claim 9, wherein the telecommunication network is a metro Ethernet network.

17. A method of automatically discovering which services are provisioned in a communications network that provides packet-switched voice service, the method comprising the computer-implemented steps of:
creating one or more service managed objects representing a network service;
creating one or more managed objects representing MGCP termination points in the communications network;
discovering a configuration of a media gateway in the communications network that includes the MGCP termination point managed objects;
determining whether any of the service managed objects contain an MGCP termination point that references the media gateway;
determining whether the MGCP termination point of the media gateway references a call agent;
associating the MGCP termination point object with a MGCP connection managed object.

18. A method as recited in claim 17, further comprising the steps of marking the MGCP connection managed object as Complete and processing any other managed objects in the telecommunication network according to the process of claim 14.

19. A method as recited in claim 17, further comprising the steps of:
- determining that a change has occurred in a managed object;
- determining whether the changed managed object is subject to one of the service discovery rules;
- performing the steps of discovering, determining, and associating of claim 17.

20. A method as recited in claim 19, further comprising the steps of:
- determining whether the changed managed object had a relationship to a particular service object prior to the change;
- determining whether the service discovery rules associated with the particular service object remain applicable;
- applying new service discovery rules when the service discovery rules associated with the particular service object are inapplicable.

21. A computer-readable storage medium carrying one or more sequences of instructions for automatically discovering which services are provisioned in a communications network, which instructions, when executed by one or more processors, cause the one or more processors to carry out the steps of:
- receiving network inventory information representing one or more physical network entities and one or more logical network entities;
- creating one or more first information elements to represent one or more network elements identified in the network inventory information, wherein the first information elements comprise network element managed objects;
- identifying one or more second information elements that match the first information elements and are associated with a network service, wherein the second information elements comprise service managed objects;
- creating a service information element to represent the network service, wherein the service information element has an association to one of the first information elements and the matching second information element; and
- creating one or more master network element managed objects that trigger creation of corresponding service managed objects when the network element managed objects do not contain information that references one or more service managed objects.

22. An apparatus for automatically discovering which services are provisioned in a communications network, comprising:
- means for receiving network inventory information representing one or more physical network entities and one or more logical network entities;
- means for creating one or more first information elements to represent one or more network elements identified in the network inventory information, wherein the first information elements comprise network element managed objects;
- means for identifying one or more second information elements that match the first information elements and are associated with a network service, wherein the second information elements comprise service managed objects;
- means for creating a service information element to represent the network service, wherein the service information element has an association to one of the first information elements and the matching second information element; and
- means for creating one or more master network element managed objects that trigger creation of corresponding service managed objects when the network element managed objects do not contain information that references one or more service managed objects.

23. An apparatus for automatically discovering which services are provisioned in a communications network, comprising:
- a network interface that is coupled to the data network for receiving one or more packet flows therefrom;
- a processor;
- one or more stored sequences of instructions which, when executed by the processor, cause the processor to carry out the steps of:
  - receiving network inventory information representing one or more physical network entities and one or more logical network entities;
  - creating one or more first information elements to represent one or more network elements identified in the network inventory information, wherein the first information elements comprise network element managed objects;
  - identifying one or more second information elements that match the first information elements and are associated with a network service, wherein the second information elements comprise service managed objects;
  - creating a service information element to represent the network service, wherein the service information element has an association to one of the first information elements and the matching second information element; and
  - creating one or more master network element managed objects that trigger creation of corresponding service managed objects when the network element managed objects do not contain information that references one or more service managed objects.

24. An apparatus as recited in claim 23, wherein each of the first information elements includes a discovery status attribute, and further comprising instructions which, when executed by the processor, cause the processor to carry out the step of: setting the discovery status attribute to complete when the service information element is created and matched.

25. An apparatus as recited in claim 23, wherein each of the first information elements includes a discovery status attribute, and further comprising instructions which, when executed by the processor, cause the processor to carry out the step of: setting the discovery status attribute to incomplete as long as no matching service information element is identified.

26. An apparatus as recited in claim 23, wherein the service information elements comprise service layer managed objects that are created based on configuration information that is implicitly present in one or more network elements supporting an associated network service.

27. An apparatus as recited in claim 23:
- wherein the identifying step includes identifying one or more second information elements that match the first information elements and are associated with a network service based on information received from a plurality of network elements that are distributed across the telecommunication network; and wherein the discovery status attribute is updated to a complete value only when the service information element is created based on information from a plurality of distributed network elements.

28. An apparatus as recited in claim 23, further comprising instructions which, when executed by the processor, cause the processor to carry out the step of: recognizing a network-level configuration mismatch when the identifying step fails to identify any matching second information elements.

29. An apparatus as recited in claim 23, wherein the telecommunication network is a packet telephony network.

30. An apparatus as recited in claim 23, wherein the telecommunication network is a metro Ethernet network.

31. An apparatus for automatically discovering which services are provisioned in a communications network, comprising:

a network interface that is coupled to the data network for receiving one or more packet flows therefrom;

a processor;

one or more stored sequences of instructions which, when executed by the processor, cause the processor to carry out the steps of:

discovering one or more network element managed objects that represent network elements in the communications network;

applying one or more service discovery rules to result in creating information representing network services supported by the network elements, by the steps of:

determining whether any of the service discovery rules specifies that one of the managed object is a master network element managed object;

creating a first service managed object when any of the service discovery rules specifies that a particular managed object is a master network element managed object;

establishing a dependency relationship between the first service managed object and the master network element managed object;

creating and storing a completion set of other service managed objects that may match the first service managed object and indicate a service in the network;

determining whether a particular network element managed object is part of the completion set; and applying one or more completion rules to the first service managed object and the particular network element managed object, to result in establishing a relationship among the first service managed object and the particular network element managed object.

32. An apparatus as recited in claim 31, wherein the first service managed object has a discovery status attribute and one or more other attributes, and further comprising instructions which, when executed by the processor, cause the processor to carry out the steps of:

determining whether any of the other attributes of the first service managed object is inconsistent with the rules;

setting the discovery status attribute to "inconsistent" when any of the other attributes of the first service managed object is inconsistent with the rules.

33. An apparatus as recited in claim 31, wherein the first service managed object has a discovery status attribute and one or more other attributes, and further comprising instructions which, when executed by the processor, cause the processor to carry out the steps of:

determining whether all completion rules are satisfied by the first service managed object;

setting the discovery status attribute to "complete" when all of the completion rules are satisfied by the first service managed object.

34. An apparatus as recited in claim 31, further comprising instructions which, when executed by the processor, cause the processor to carry out the steps of:

determining that a change has occurred in a network element managed object;

determining whether the changed network element managed object is subject to one of the service discovery rules;

performing the steps of discovering, applying, determining, creating and establishing of claim 31.

35. An apparatus as recited in claim 34, further comprising instructions which, when executed by the processor, cause the processor to carry out the steps of:

determining whether the changed network element managed object had a relationship to a particular service object prior to the change;

determining whether the service discovery rules associated with the particular service object remain applicable;

applying new service discovery rules when the service discovery rules associated with the particular service object are inapplicable.

36. An apparatus as recited in claim 31, further comprising instructions which, when executed by the processor, cause the processor to carry out the step of: recognizing a network-level configuration mismatch when the identifying step fails to identify any matching second information elements.

37. An apparatus as recited in claim 31, wherein the telecommunication network is a packet telephony network.

38. An apparatus as recited in claim 31, wherein the telecommunication network is a metro Ethernet network.

* * * * *